United States Patent
Teyeb et al.

(10) Patent No.: US 10,869,359 B2
(45) Date of Patent: Dec. 15, 2020

(54) METHODS OF OPERATING WIRELESS TERMINALS AND NETWORK NODES AND RELATED WIRELESS TERMINALS AND NETWORK NODES

(71) Applicant: Telefonaktiebolaget LM Ericsson (publ), Stockholm (SE)

(72) Inventors: Oumer Teyeb, Solna (SE); Angelo Centonza, Stockholm (SE); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 15/756,305

(22) PCT Filed: Dec. 13, 2017

(86) PCT No.: PCT/SE2017/051264
§ 371 (c)(1),
(2) Date: Feb. 28, 2018

(87) PCT Pub. No.: WO2018/208199
PCT Pub. Date: Nov. 15, 2018

(65) Prior Publication Data
US 2019/0075613 A1 Mar. 7, 2019

Related U.S. Application Data

(60) Provisional application No. 62/505,347, filed on May 12, 2017.

(51) Int. Cl.
*H04W 76/36* (2018.01)
*H04W 76/27* (2018.01)
(Continued)

(52) U.S. Cl.
CPC ............. *H04W 76/36* (2018.02); *H04W 8/08* (2013.01); *H04W 24/02* (2013.01);
(Continued)

(58) Field of Classification Search
CPC . H04W 36/0083; H04W 76/11; H04W 76/36; H04W 8/08; H04W 76/27; H04W 24/02; H04W 36/245
See application file for complete search history.

(56) References Cited

U.S. PATENT DOCUMENTS 9,131,493 B2   9/2015   Park et al.
2002/0172178 A1* 11/2002 Suzuki ................. H04W 76/38
                                                       370/338

(Continued)

FOREIGN PATENT DOCUMENTS

| KR | 101424258 B1 | 8/2014 |
|---|---|---|
| WO | 2014084675 A1 | 6/2014 |
| WO | WO 2015/044682 A1 | 4/2015 |

OTHER PUBLICATIONS

LTE; Evolved Universal Terrestrial Radio Access Network (EUTRAN); X2 Application Protocol (X2AP) (3GPP TS 36.423 version 14.2.0 Release 14) Apr. 2017, 242 pages.
(Continued)

*Primary Examiner* — Anez C Ebrahim
(74) *Attorney, Agent, or Firm* — Sage Patent Group

(57) ABSTRACT

According to one exemplary embodiment, a wireless terminal supporting wireless communication with a wireless communication network. The wireless terminal may be configured to operate in a connected mode during which the wireless terminal transmits uplink data to the wireless communication network and/or receives downlink data from the wireless communication network, in an inactive mode during which the wireless terminal maintains an access stratum context and a resume identity, and in an idle mode during (Continued)

which the wireless terminal does not maintain an access stratum context. The wireless terminal may store mobility history information for a cell visited by the wireless terminal, and the information for the cell may include a time spent in the inactive mode in the cell. The wireless terminal may also transmit the mobility history information for the cell visited by the wireless terminal to a base station of the wireless communication network.

23 Claims, 12 Drawing Sheets

(51) Int. Cl.
    *H04W 24/02*     (2009.01)
    *H04W 36/00*     (2009.01)
    *H04W 76/11*     (2018.01)
    *H04W 8/08*     (2009.01)
    *H04W 36/24*     (2009.01)
    *H04W 76/19*     (2018.01)
    *H04W 80/08*     (2009.01)

(52) U.S. Cl.
    CPC ..... *H04W 36/0083* (2013.01); *H04W 36/245* (2013.01); *H04W 76/11* (2018.02); *H04W 76/27* (2018.02); *H04W 76/19* (2018.02); *H04W 80/08* (2013.01)

(56) References Cited

U.S. PATENT DOCUMENTS

| | | | |
|---|---|---|---|
| 2008/0095090 A1 | 4/2008 | Lee et al. | |
| 2013/0225178 A1* | 8/2013 | Kojima | H04W 36/245 455/437 |
| 2015/0126148 A1* | 5/2015 | Hong | H04W 4/029 455/405 |
| 2017/0311290 A1* | 10/2017 | Adjakple | H04W 36/00 |
| 2018/0007630 A1* | 1/2018 | Nacer | H04W 76/30 |
| 2018/0227851 A1* | 8/2018 | Kubota | H04W 52/0229 |

OTHER PUBLICATIONS

LTE; Evolved Universal Terrestrial Radio Access (E-UTRA); Radio Resource Control (RRC); Protocol Specification (3GPP TS 36.331 version 14.2.2 Release 14) May 2017, 727 pages.

International Search Report and Written Opinion of the International Searching Authority, PCT/SE2017/051264, dated Mar. 8, 2018, 13 pages.

"LTE; Evolved Universal Terrestrial Radio Access (E-UTRA); Radio Resource Control (RRC); Protocol Specification," (XP051298184) 3GPP TS 36.331, Version 14.2.2 (Release 14), ETSI TS 136 331 V14.2.2 (May 2017), 727 pages.

LTE; Evolved Universal Terrestrial Radio Access Network (E-UTRAN); X2 Application Protocol (X2AP) (XP051297693) (3GPP TS 36.423 Version 14.2.0 (Release 14), ETSI TS 136.423 V14.2.0 (Apr. 2017), 242 pages.

LTE; Evolved Universal Terrestrial Radio Access Network (E-UTRAN); S1 Application Protocol (S1AP) (XP051297692) (3GPP TS 36.413 Version 14.2.0 (Release 14), ETSI TS 136 413 V14.2.0 (Apr. 2017) 349 pages.

International Search Report and Written Opinion of the International Searching Authority, PCT/SE2017/051264, dated Mar. 8, 2018, 15 pages.

Evolved Universal Terrestrial Radio Access Network (E-UTRAN); S1 Application Protocol(S1AP) Release 14 (3GPP TS 36.413 version 14.2.0) vol. RAN WG3, Mar. 27, 2017 (XP051297692) 342 pages.

First Office Action dated Jun. 11, 2020 for Indian Patent Application No. 201817012347, 6 pages.

* cited by examiner

Figure 5

| IE/Group Name | Presence | Range | IE type and reference | Semantics description | Criticality | Assigned Criticality |
|---|---|---|---|---|---|---|
| Last Visited Cell List | | 1..<maxnoofCells> | | Most recent information is added to the top of this list | – | – |
| >Last Visited Cell Information | M | | 9.2.39 | | – | – |

| Range bound | Explanation |
|---|---|
| maxnoofCells | Maximum number of last visited cell information records that can be reported in the IE. Value is 16. |

Figure 6

| IE/Group Name | Presence | Range | IE type and reference | Semantics description | Criticality | Assigned Criticality |
|---|---|---|---|---|---|---|
| CHOICE Last Visited Cell Information | M | | | | - | - |
| >E-UTRAN Cell | | | | | | |
| >>Last Visited E-UTRAN Cell Information | M | | 9.2.40 | | | |
| >UTRAN Cell | | | | | | |
| >>Last Visited UTRAN Cell Information | M | | OCTET STRING | Defined in TS 25.413 [24] | - | - |
| >GERAN Cell | | | | | | |
| >>Last Visited GERAN Cell Information | M | | 9.2.41 | | - | - |

Figure 7

| IE/Group Name | Presence | Range | IE type and reference | Semantics description | Criticality | Assigned Criticality |
|---|---|---|---|---|---|---|
| Global Cell ID | M | | ECGI 9.2.14 | | - | - |
| Cell Type | M | | 9.2.42 | | - | - |
| Time UE stayed in Cell | M | | INTEGER (0..4095) | The duration of the time the UE stayed in the cell in seconds. If the UE stays in a cell more than 4095s, this IE is set to 4095. | | |
| Time UE stayed in Cell Enhanced Granularity | O | | INTEGER (0..40950) | The duration of the time the UE stayed in the cell in 1/10 seconds. If the UE stays in a cell more than 4095s, this IE is set to 40950. | YES | ignore |
| Total time in inactive state | O | | INTEGER (0..4095) | | | |
| Longest time in inactive state | O | | INTEGER (0..4095) | | | |
| Shortest time in inactive state | O | | INTEGER (0..4095) | | | |
| Average time in inactive state | O | | INTEGER (0..4095) | | | |
| Successful Inactive to Connected Transitions | O | | INTEGER (0..N) | | | |
| Failed Inactive to Connected Transitions | O | | INTEGER (0..N) | | | |
| HO Cause Value | O | | Cause 9.2.8 | The cause for the handover from the E-UTRAN cell. | YES | ignore |

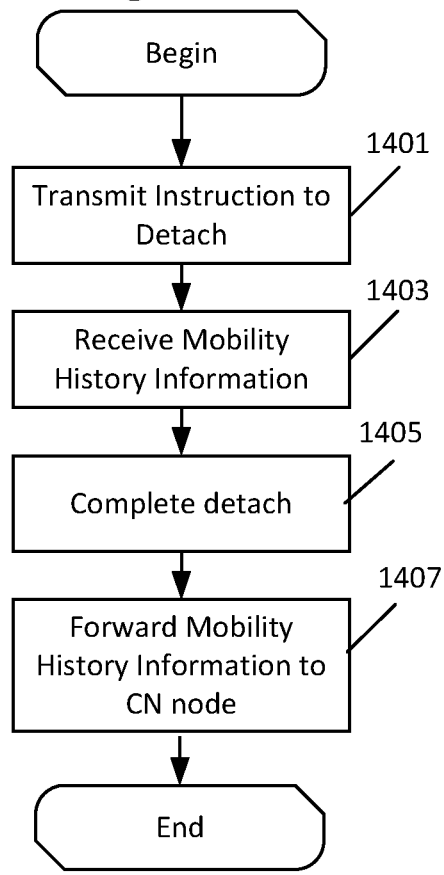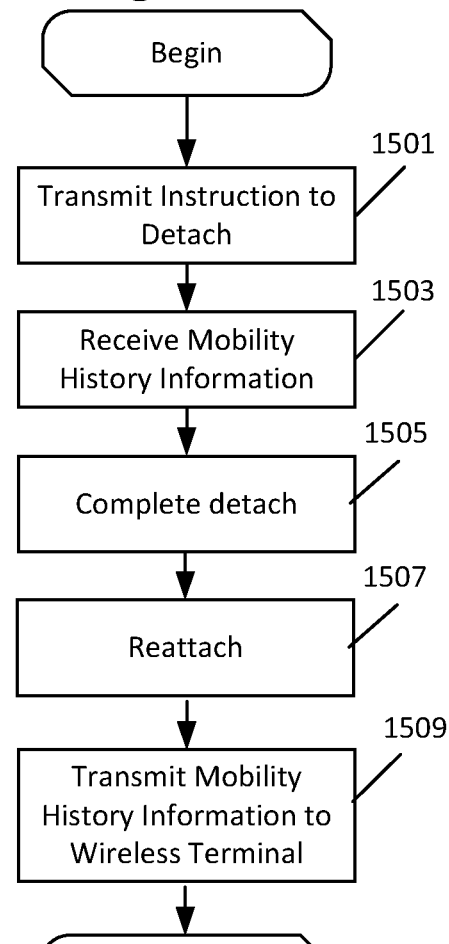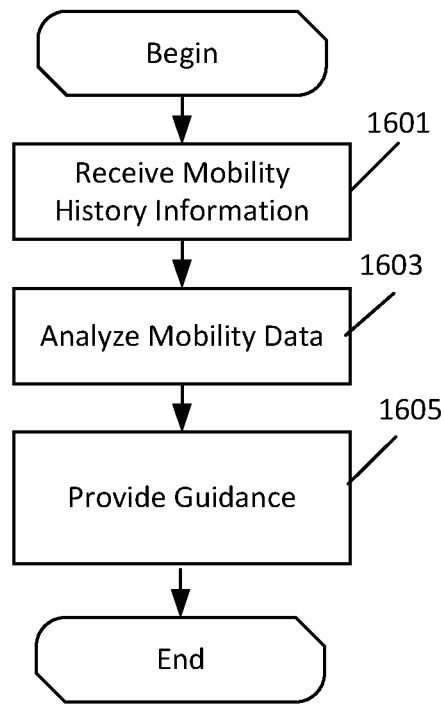

METHODS OF OPERATING WIRELESS TERMINALS AND NETWORK NODES AND RELATED WIRELESS TERMINALS AND NETWORK NODES

CROSS REFERENCE TO RELATED APPLICATIONS

This application is a 35 U.S.C. § 371 national stage application of PCT International Application No. PCT/US2017/051264 filed on Dec. 13, 2017, which in turns claims domestic priority to U.S. Provisional Patent Application No. 62/505,347, filed on May 12, 2017, the disclosures and content of which are incorporated by reference herein in their entirety.

TECHNICAL FIELD

The present application generally relates to communications, and more particularly, to methods provide wireless communications and related wireless terminals and network nodes.

BACKGROUND

FIG. 1 illustrates S1/EPS architecture based operations used/required to establish a connection of an IDLE UE (IDLE-CONNECTED mode transition), and also to tear down the connection when the UE has not been active for a period of time (CONNECTED-IDLE mode transition). A Random Access RA procedure between the wireless terminal UE and the base station eNB (including RA msg1 message with an RA preamble, RA msg2 message response, RA msg3 RRC Connection Request message) may be used to initiate the setup. Then NAS related messages between the base station eNB and the mobility management entity MME (including an S1-AP Initial UE message and an S1-AP Initial context Setup Request message) may be used to initiate a NAS service request. A series of messages between the wireless terminal UE and base station eNB (including an RRC security mode command message, an RRC Security Mode Complete message, an RRC Connection Reconfiguration message, and an RRC Connection Reconfiguration Complete message) may be used to establish an RRC security mode and a RRC connection. An S1-AP initial context setup complete message may then be transmitted from the eNB to the MME, and modify bearer request and response messages may be transmitted between the MME and a serving gateway SGW to complete the LTE connection setup.

Upon completion of the LTE connection setup, the wireless terminal UE may transmit uplink data through the eNB to the SGW, and the SGW may transmit downlink data through the eNB to the UE in the connected state. Upon timeout of an inactivity timer, the eNB may transmit an S1-AP UE context release request message to the MME, and release access bearers request and response messages may be communicated between the MME and SGW. After releasing the access bearers, the MME may transmit an S1-AP UE context release command to the eNB, and the eNB may transmit an RRC connection release message to the UE. The tear down may be completed when the eNB transmits an S1-AP context release complete message to the MME.

As can be seen, there may thus be a significant signaling overhead on the radio/Uu and S1AP interfaces during IDLE-CONNECTED mode transitions in LTE.

SUMMARY

Some embodiments of inventive concepts provide methods of operating a wireless terminal supporting wireless communication with a wireless communication network. The wireless terminal is configured to operate in a connected mode during which the wireless terminal transmits uplink data to the wireless communication network and/or receives downlink data from the wireless communication network, in an inactive mode during which the wireless terminal maintains an access stratum context and a resume identity, and in an idle mode during which the wireless terminal does not maintain an access stratum context. The wireless terminal stores mobility history information for a cell visited by the wireless terminal, and the information for the cell includes a time spent in the inactive mode in the cell. The wireless terminal may transmits the mobility history information for the cell visited by the wireless terminal to a base station of the wireless communication network.

Some other embodiments of inventive concepts provide methods of operating a node of a wireless communication network supporting communication with a wireless terminal. The node is configured to support a connected mode for the wireless terminal during which uplink data is received from the wireless terminal and/or downlink data is transmitted to the wireless terminal, an inactive mode for the wireless terminal during which an access stratum context and a resume identity are maintained for the wireless terminal, and an idle mode for the wireless terminal during which an access stratum context is not maintained for the wireless terminal. The node provides mobility history information for the wireless terminal. The mobility history information includes information for a cell visited by the wireless terminal, and the information for the cell includes a time spent by the wireless terminal in the inactive mode in the cell.

Further embodiments of inventive concepts provide e.g. wireless terminals and network nodes related to the above methods.

According to some embodiments of inventive concepts, signaling overhead, UE power consumption, and/or network resource usage may be reduced.

BRIEF DESCRIPTION OF THE DRAWINGS

FIGS. 5, 6, and 7 respectively illustrate UE history information, Last visited cell information, and last visited E-UTRAN cell information according to some embodiments of inventive concepts;

FIGS. 14, 15, and 16 are flow charts illustrating additional network node operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 8:
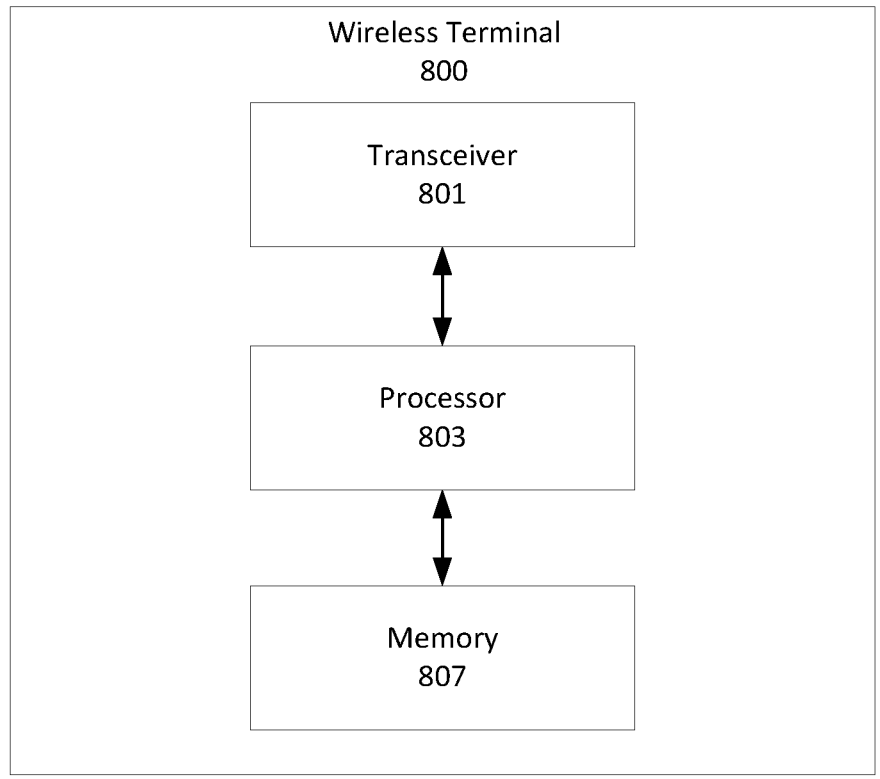
FIG. 8 is a block diagram illustrating a wireless terminal UE according to some embodiments of inventive concepts.

FIG. 8 is a block diagram illustrating a wireless terminal UE (also referred to as a mobile terminal, user equipment, user equipment node, etc.) according to some embodiments disclosed herein. As shown, wireless terminal UE 800 may include processor 803 coupled with transceiver 801, and memory 807. Transceiver 801 may include one or more of a cellular radio access network (RAN) interface (also referred to as a RAN transceiver) and/or other wireless network communication interface. Wireless terminal can thus provide wireless communication over one or more radio links with one or more radio access network nodes (also referred to as base stations, eNodeBs, eNBs, gNodeBs, gNBs, etc.). Processor 803 (also referred to as a processor circuit or processing circuitry) may include one or more data processing circuits, such as a general purpose and/or special purpose processor (e.g., microprocessor and/or digital signal processor). Processor 803 may be configured to execute computer program instructions from functional modules in memory 807 (also referred to as a memory circuit or memory circuitry), described below as a computer readable medium, to perform some or all of the operations and methods that are described herein for one or more of the embodiments. Moreover, processor 803 may be defined to include memory so that separate memory 807 may not be required. Wireless terminal 800, processor 803, and transceiver 801 may thus perform operations, for example, discussed below with respect to the figures and/or Example Embodiments.

Figure 9:
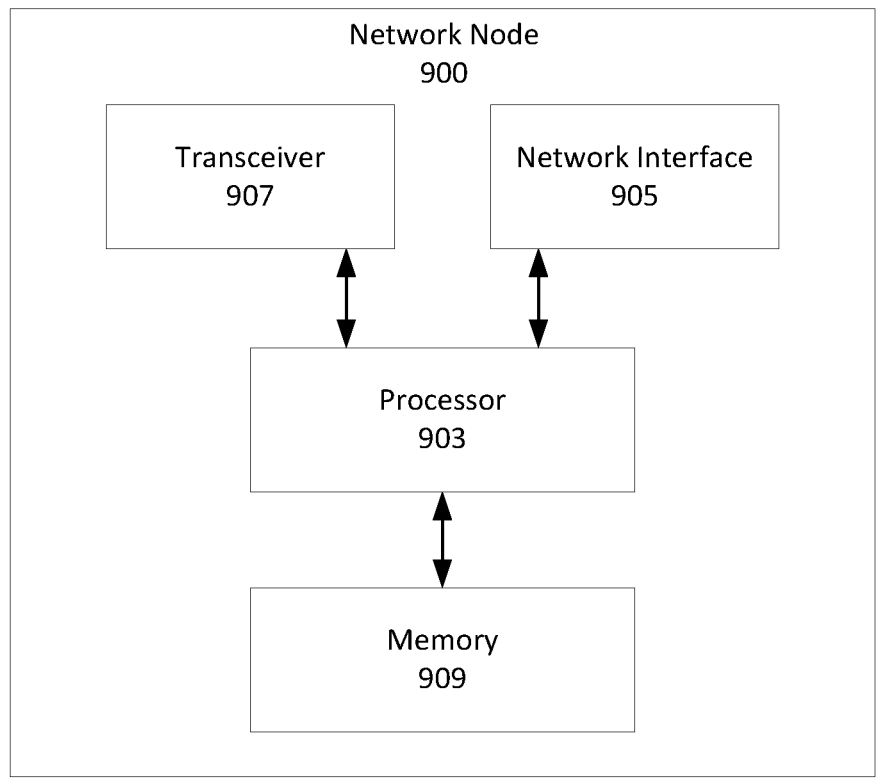
FIG. 9 is a block diagram illustrating a network node according to some embodiments of inventive concepts.

FIG. 9 is a block diagram illustrating a network node 900 according to some embodiments disclosed herein. As shown, network node 900 may include processor 903 coupled with network interface 905, transceiver 907, and memory 909. Transceiver 907 may include a cellular radio access network (RAN) interface (also referred to as a RAN transceiver) and/or other wireless network communication interface. Network node 900 can thus provide wireless communication over one or more radio links with one or wireless terminals. Network interface 905 may provide communication with other network nodes/devices such as a plurality of network nodes, for example to support dual connectivity for a wireless terminal. Processor 903 (also referred to as a processor circuit or processing circuitry) may include one or more data processing circuits, such as a general purpose and/or special purpose processor (e.g., microprocessor and/or digital signal processor). Processor 903 may be configured to execute computer program instructions from functional modules in memory 909 (also referred to as a memory circuit or memory circuitry), described below as a computer readable medium, to perform some or all of the operations and methods that are described herein for one or more of the embodiments. Moreover, processor 903 may be defined to include memory so that separate memory 909 may not be required. Network node 900, processor 903, network interface 905, and transceiver 907 may thus perform operations, for example, discussed below with respect to the figures and/or Example Embodiments.

The structure of FIG. 9 may be applied as a radio access network node such as a base station according to some embodiments. According to some other embodiments, the structure of FIG. 9 may be applied as core network node without a transceiver with downlink data/information being transmitted from the core network node through a radio access network node to a wireless terminal, and with uplink data/information being received from wireless terminal through the radio access network node.

In 3GPP, work is ongoing, both in LTE and NR, towards supporting a lightly connected UE (inactive mode), which can be considered as an intermediate state between IDLE and CONNECTED modes, where the UE AS context is kept both at the UE and RAN, where the UE can still be seen as if it is in connected mode from the CN point of view and in IDLE mode from the RAN point of view. An advantage of operating in this mode is reduced signaling towards the CN and faster transition to CONNECTED mode as compared to IDLE-CONNECTED mode transitions, while maintaining the UE power saving advantages of IDLE mode.

As used herein, the terms "inactive", "suspended", and "lightly connected" may be used interchangeably. Is still for further study (FFS) in NR as to whether a UE's inactive←→connected mode transitions are hidden completely from the core network CN, from both control plane CP and user plane UP perspectives. The present disclosure may be applicable to both cases (i.e., CN is aware of the inactive/connected state transitions or the state transitions are transparent to the CN).

In LTE, when a decision is made by the network to move the UE to inactive state, the eNB sends the UE an RRCConnectionRelease message with the release cause of rrc-suspend and it is also provided with a Resume ID. The UE stores the resumeIdentity and UE AS context (including the current RRC configuration, the current security context, the PDCP state including ROHC state, C-RNTI used in the source PCell, the cellIdentity and the physical cell identity of the source PCell); re-establishes all RLC entities (both for SRBs and DRBs); and suspends all DRBs and SRBs expect SRB0. RRC connection suspend operations are illustrated in FIG. 2 as discussed below.

Figure 1:
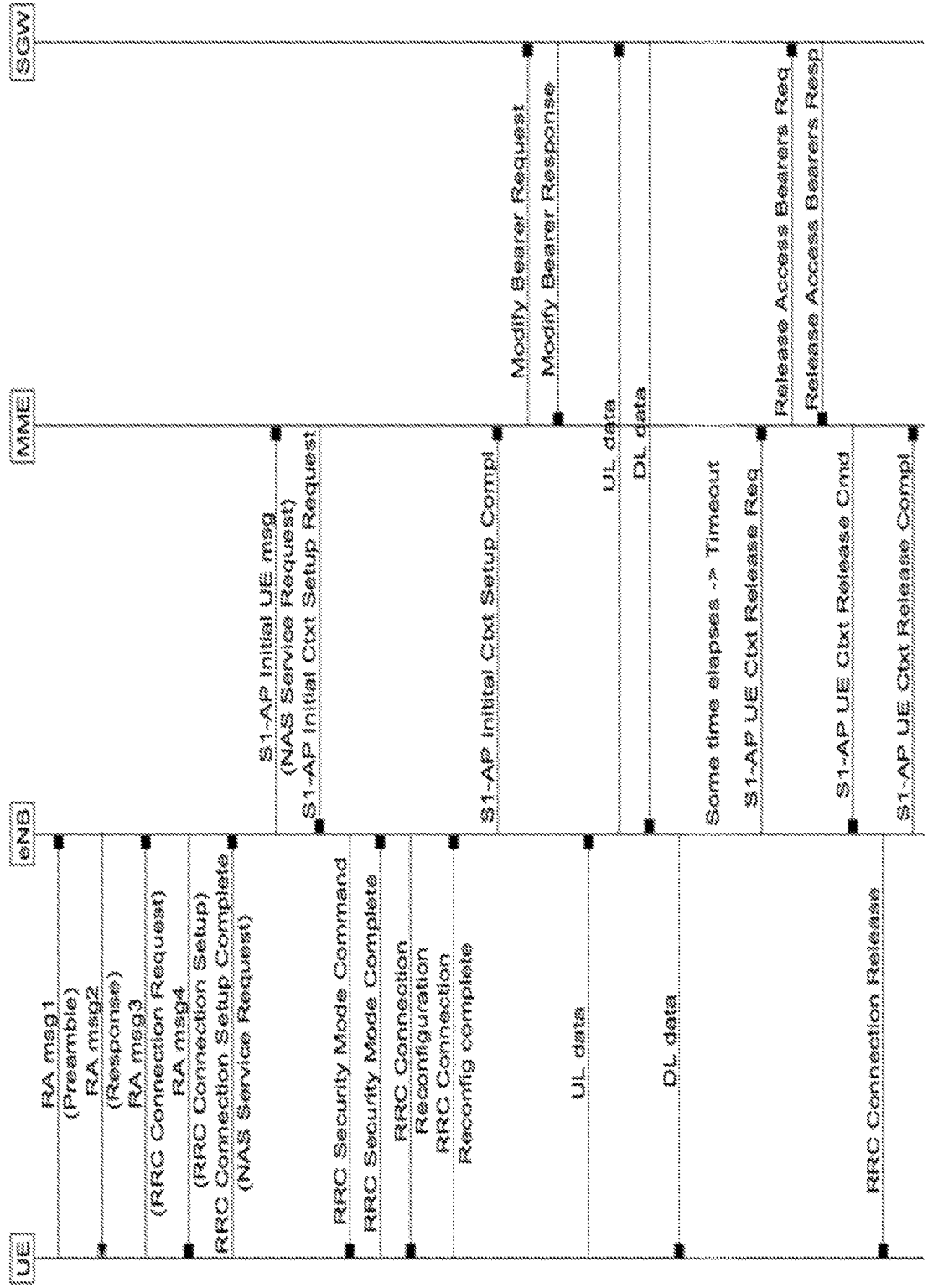
FIG. 1 is a signaling diagram illustrating Long Term Evolution LTE connection setup and tear down.
Figure 2:
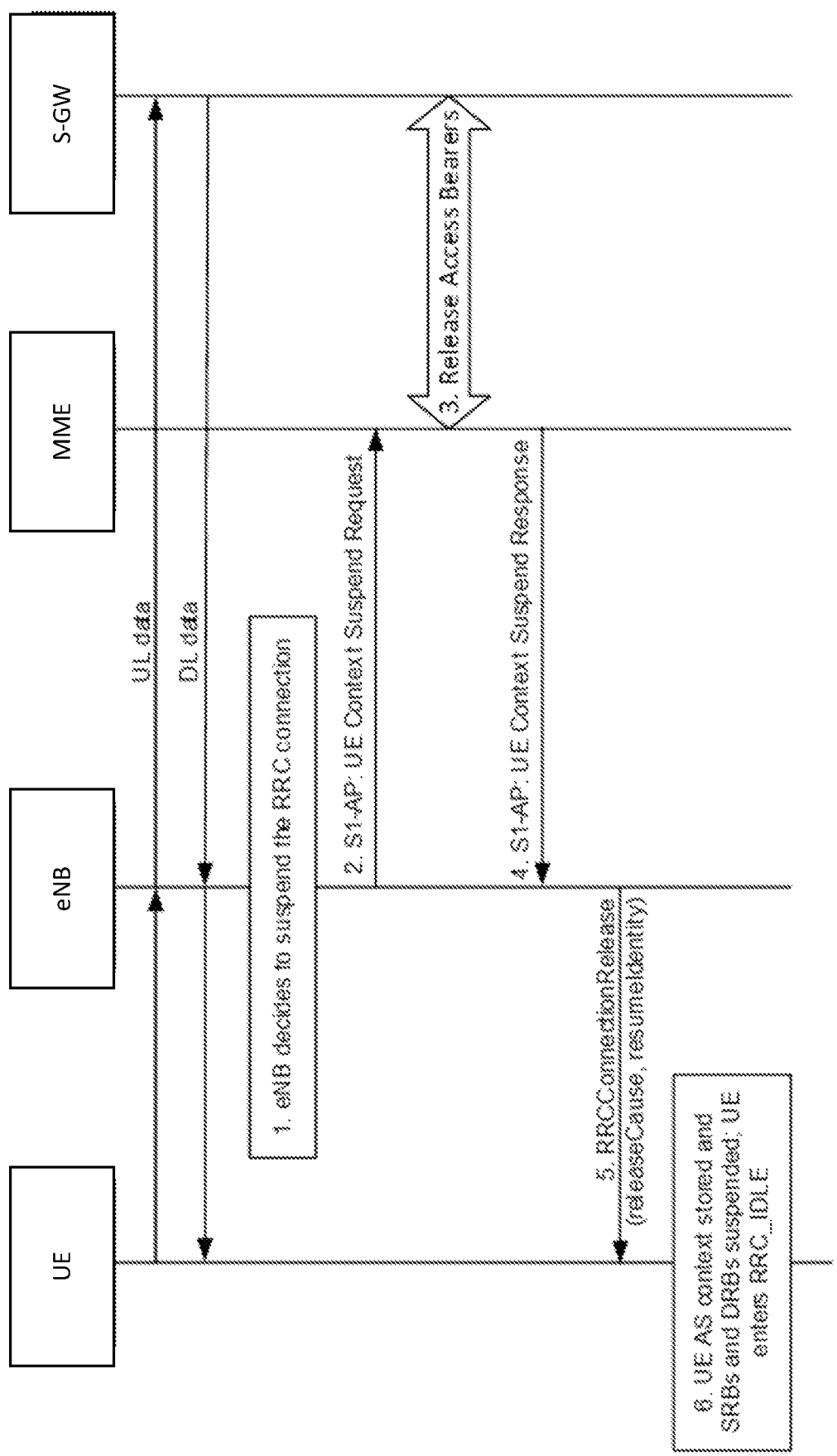
FIG. 2 is a signaling diagram illustrating Radio Resource Control RRC connection suspend operations.

FIG. 2, Operation 1. Due to some triggers (e.g., the expiration of a UE inactivity timer), the eNB decides to suspend the RRC connection.

FIG. 2, Operation 2. The eNB initiates the S1-AP UE Context Suspend procedure to inform the MME that the RRC connection is being suspended by transmitting an S1-AP UE Context Suspend Request message.

FIG. 2, Operation 3. The MME requests the S-GW to release all S1-U bearers for the UE.

FIG. 2, Operation 4. The MME Acknowledges (Acks) the request of operation 2.

FIG. 2, Operation 5. The eNB suspends the RRC connection by sending an RRCConnectionRelease message with the releaseCause set to rrc-Suspend. The message includes the resumeIdentity which is stored by the UE.

FIG. 2, Operation 6. The UE stores the AS context, suspends all SRBs and DRBs, and the UE enters RRC_IDLE light connected (inactive) state.

When the UE later on wants to resume the connection (in response to UpLink UL data to be sent or a paging request for DownLink DL data), the UE sends an RRCConnectionResumeRequest message with the saved resumeIdentity. The eNB responds with an RRCConnectionResume message, and both the UE and eNB restore the saved UE context, and data transmission/reception from/to the UE can be resumed. Note that the resume operation can be performed in an eNB other than the eNB that was serving the UE when the UE was suspended. In that case, the new eNB can perform a context fetch (e.g., by using the Retrieve UE Context procedure from the old eNB using the resumeIdentity which includes information about the old eNB/cell). RRC connection resume operations in the same eNB and in a new eNB are illustrated in FIG. 3 and FIG. 4, respectively.

Figure 3:
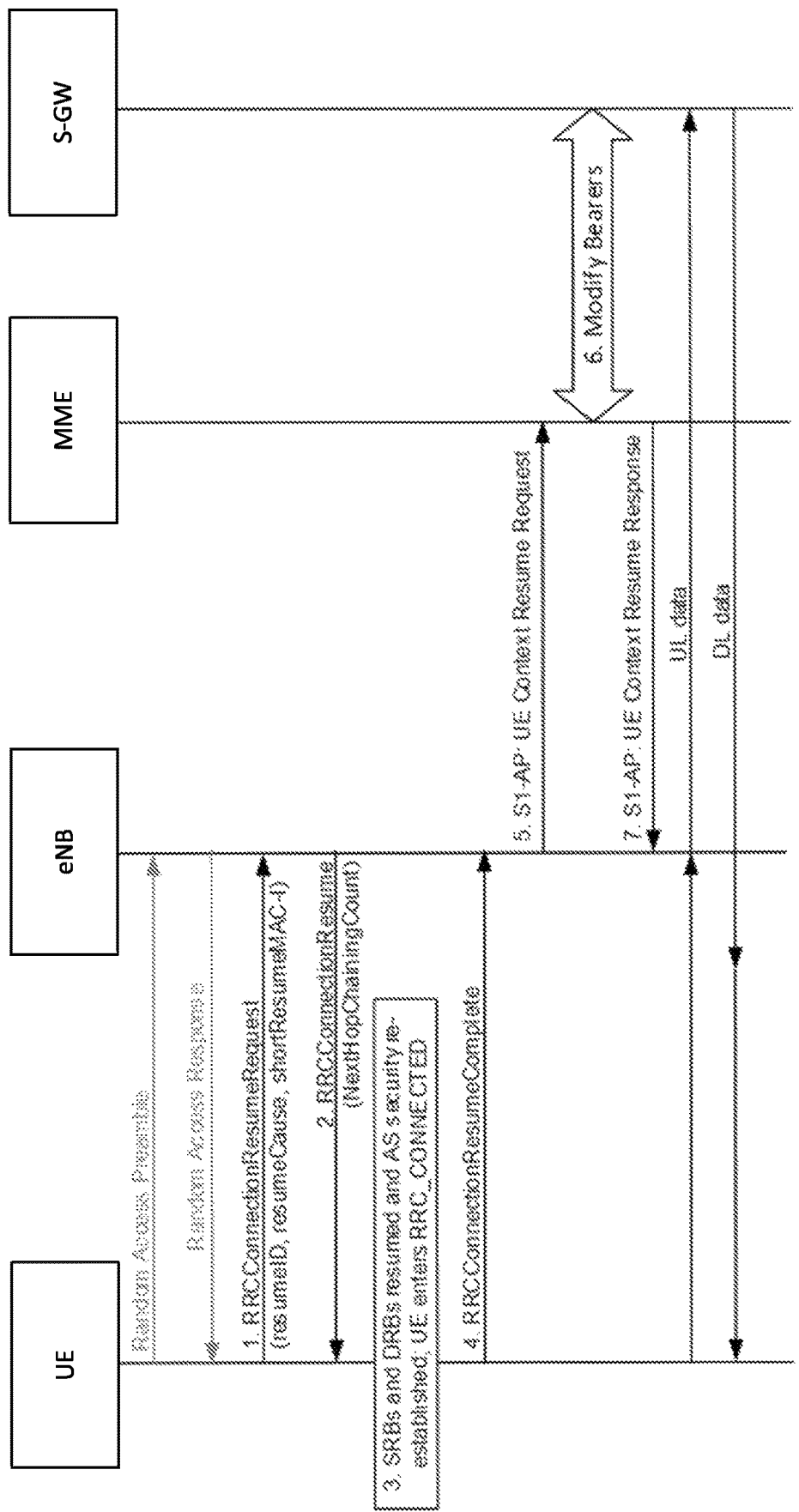
FIG. 3 is a signaling diagram illustrating an RRC connection resume procedure where the wireless terminal UE resumes connection with the same base station eNB where it was suspended.
Figure 4:
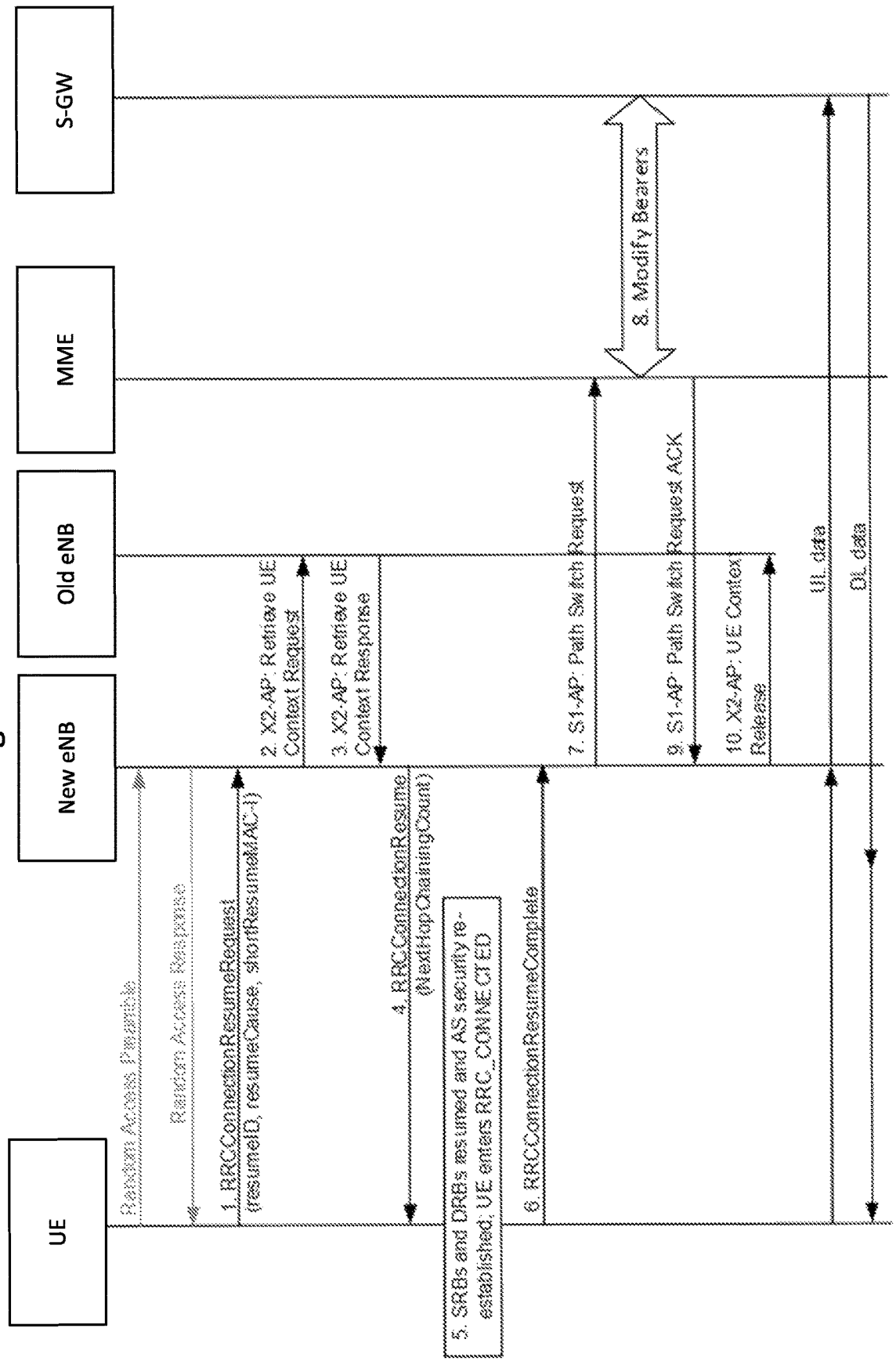
FIG. 4 is a signaling diagram illustrating an RRC resume procedure where the wireless terminal UE goes inactive (suspends operation) with one eNB (the source eNB or old eNB) and resumes reconnection with another eNB (the new eNB) different from the source eNB.

FIG. 3 is a signaling diagram illustrating an RRC connection resume procedure where the wireless terminal UE goes inactive and resumes connection with the same base station eNB.

FIG. 3, Operation 1. At some later point in time (e.g., when the UE is being paged or when new data arrives in the uplink buffer) the UE resumes the connection by sending an RRCConnectionResumeRequest to the eNB. The UE includes its Resume ID, the establishment cause, and authentication token. The authentication token is calculated in the same way as the short MAC-I used in RRC connection re-establishment and allows the eNB to verify the UE identity.

FIG. 3, Operation 2. Provided that the Resume ID exists and the authentication token is successfully validated, the eNB responds with an RRCConnectionResume. The message includes the Next Hop Chaining Count (NCC) value which is used/required to re-establish the AS security.

FIG. 3, Operation 3. The UE resumes all SRBs and DRBs and re-establishes the AS security. The UE is now in RRC_CONNECTED state.

FIG. 3, Operation 4. The UE responds with an RRCConnectionResumeComplete confirming that the RRC connection has been resumed successfully.

FIG. 3, Operation 5. The eNB initiates the S1-AP Context Resume procedure to notify the MME about the UE state change.

FIG. 3, Operation 6. The MME requests the S-GW to activate the S1-U bearers for the UE.

FIG. 3, Operation 7. The MME Acknowledges (Acks) the resume request of operation 5.

FIG. 4 is a signaling diagram illustrating an RRC resume procedure where the wireless terminal UE goes inactive (suspends operation) with one eNB (the source eNB or old eNB) and resumes reconnection with another eNB (the new eNB) different from the source eNB.

FIG. 4, Operation 1. Same as operation 1 of FIG. 3.

FIG. 4, Operation 2. The new eNB locates the old eNB using the Resume ID and retrieves the UE context by means of the X2-AP Retrieve UE Context procedure.

FIG. 4, Operation 3. The old eNB responds with the UE context associated with the Resume ID.

FIG. 4, Operation 4. Same as operation 2 in FIG. 3.

FIG. 4, Operation 5. Same as operation 3 in FIG. 3.

FIG. 4, Operation 6. Same as operation 4 in FIG. 3.

FIG. 4, Operation 7. The new eNB initiates the S1-AP Path Switch procedure to establish an S1 UE associated signaling connection to the serving MME and to request the MME to resume the UE context.

FIG. 4, Operation 8. The MME requests the S-GW to activate the S1-U bearers for the UE and updates the downlink path.

FIG. 4, Operation 9. The MME Acknowledges (Acks) the path switch request of operation 7.

FIG. 4, Operation 10. After the S1-AP Path Switch procedure, the new eNB triggers release of the UE context at the old eNB using the X2-AP UE Context Release procedure/message.

In LTE, a UE may support the storage of mobility history information. Whenever such a UE is handed over to another in RRC_CONNECTED state or changes the serving cell while in RRC_IDLE, it updates the current cell in its mobility history [3GPP TS 36.331]. The UE can keep up to 16 cells in this history, and for each entry, there is also an associated time spent in the corresponding cell (i.e. when the UE leaves a cell, it will update the time spent field of the cell it has just left).

The UE can communicate that it has such an information when completing RRC connection setup or RRC connection resume procedures (i.e., indicate a flag that it has such information in the RRCConnectionSetupComplete and/or RRCConnectionResumeComplete messages). The eNB can then request this information via the UEInformationRequest procedure and the UE reports it in the UEInformationResponse message (this time updating the time spent in the current cell as well).

During handover, the source eNB includes the UE history information in the HandoverRequest message that it sends to the target eNB. The target eNB stores the UE history information, and can utilize it in further handovers (i.e., knowing the UE history on handover, the target eNB can include its own identity and the time the UE has spent on its cell on this history information in the next handover). Optionally, the last UE history received in a UEinformationResponse can be included as well as the UE history updated by the eNB [3GPP TS 36.423]

3GPP specifies the information elements (IEs) of the UE history information and on how the UE history information is communicated between the UE and eNB and between eNBs during handover. How it is actually used, however, may be left to network implementation. Radio Resource Management (RRM) is one network functionality that can benefit from UE history (e.g., HO prediction, setting up the measurement configuration of the UE, automatic neighbor relation information, etc.).

As discussed above, the reason for the introduction of inactive state and RRC suspend/resume procedures is reduced signaling (especially in the CN), and also faster transitions to CONNECTED state when the connection has to be resumed due to incoming UL or DL data. But putting a UE in inactive/suspended state has its own disadvantages in that saving a UE context consumes resources in the source eNB. This is not only in saving the UE context info, but an eNB may reserve some radio resources in anticipating the inactive UE to become active again. If no such reservations are made, there will be no guarantee the UE will be able to resume later on as the network conditions might have changed considerably during the time the UE was inactive (many UEs have been handed over to the eNB or have transited from IDLE to CONNECTED mode, etc.). Thus, putting every UE into inactive/suspended mode when it has not been transmitting/receiving for some time is not efficient.

According to some embodiments of inventive concepts, more efficient decisions on whether to put a UE into inactive mode or IDLE mode may be enabled by tracking the UE history in active, inactive and IDLE states.

According to some embodiments of inventive concepts, improved selection of an inactive state or an idle state for a wireless terminal UE may reduce unnecessary use of network resources.

According to some embodiments of inventive concepts, a UE's history in the inactive state may be stored and provided to the wireless communication network. This inactive state information may include:
- a list of cells the UE traversed while in inactive state, including absolute times and/or statistical information such as average times, maximum times, minimum times, standard deviations, etc.
- additional information such as numbers of successful/failure transitions from the inactive state to the active/connected state (i.e., if RRCResumeRequest resulted in successful connection or not)

This information may be included in an enhanced version of UE mobility history (varMobilityHistoryReport specified in 36.331 or/and UE history information specified in 36.423) or a new information element can be specified to capture only the inactive state transitions.

An example of how the varMobilityHistoryReport can be enhanced to support inactive state history is given below, where the elements highlighted with bold (e.g., timespentinactive, longesttimespentinactive, shortestTimeSpentInInactive, averageTimeSpentinInactive, successfulInactiveToConnected, and failedInactiveToConnected) are the additions. Note that the varMobilityHistoryReport includes a list of VisitedCellInfo and the changes are on the VisitedCellInfo. In the last two information elements, the N in an integer value (e.g. 10) that is specified to determine the maximum successful/failed inactive to connected transitions that can be recorded.

Similarly, the UE history information can be enhanced to support similar functionalities as discussed below with respect to FIGS. 5, 6, and 7 (where the changes are also highlighted). Note that the UE history information includes a Last Visited Cell Information and this in turn includes information regarding Last Visited E-UTRAN Cell Information. According to some embodiments of inventive concepts, the "Time UE stayed in Cell Enhanced Granularity", "Total time in inactive state", "Longest time in inactive state", "Shortest time in inactive state", "Average time in inactive state", Successful Inactive to Connected Transitions", and "Failed Inactive to Connected Transitions" may be included in the last visited E-UTRAN cell information of FIG. 7. FIGS. 5, 6, and 7 respectively illustrate UE history information, Last visited cell information, and last visited E-UTRAN cell information according to some embodiments of inventive concepts.

In FIG. 7, the Last Visited E-UTRAN Cell Information may be used to storing information regarding both LTE and NR cells. If it is desired to differentiate LTE and NR cells, a flag can be added to the information element IE of FIG. 7 (e.g., a value of 0 signifying an LTE cell and a value of 1 for NR cells). Another alternative is to define a new Last Visited NR Cell Information element to store the NR cells separately. The limits of 4095 in FIG. 7 are provided by way of example, but the actual limit values may be higher or lower.

Moreover, the fields discussed above with respect to FIG. 7 are provided by way of example. According to other embodiments of inventive concepts, additional/other information elements may be provided, such as the individual transitions between active← →inactive, inactive← →idle, and idle← →connected transitions (including the timestamps). In addition, the "maximum number" of "16" from FIG. 5 ("Maximum number of last visited cell information records that can be reported in the IE. Value is 16.") is provided by way of example, but fewer or more cell information records may be provided according to other embodiments of inventive concepts.

In some embodiments of the inventive concepts, when a UE detaches from the network (e.g., UE powered off, battery drained, radio link failure, explicitly detached by the MME, etc.), the UE may save the UE history in non-volatile memory (e.g., on the SIM card, or other UE non-volatile/permanent memory storage, either internal or external such as a microSD card). When the UE is reattached (e.g., powered on, radio link restored, and/or RRC connection

```
VarMobilityHistoryReport-r12::= VisitedCellInfoList-r12
VisitedCellInfoList-r12      ::=      SEQUENCE (SIZE (1..maxCellHistory-r12)) OF
VisitedCellInfo-r12
VisitedCellInfo-r12 ::       = SEQUENCE {
    visitedCellId-r12             CHOICE {
       cellGlobalId-r12           CellGlobalIdEUTRA,
       pci-arfcn-r12              SEQUENCE {
          physCellId-r12          PhysCellId,
          carrierFreq-r12         ARFCN-ValueEUTRA-r9
       }
    }                                                  OPTIONAL,
    timeSpent-r12                 INTEGER (0..4095),
... timeSpentInInactive           INTEGER (0..4095)             OPTIONAL,
    longestTimeSpentInInactive    INTEGER (0..4095)             OPTIONAL,
    shortestTimeSpentInInactive   INTEGER (0..4095)             OPTIONAL,
    averageTimeSpentinInactive    I INTEGER (0..4095)           OPTIONAL,
    successfulInactiveToConnected INTEGER (0..N)                OPTIONAL,
    failedInactiveToConnected     INTEGER (0..N)                OPTIONAL,
}
``` setup, etc.), the UE can start using the stored UE history developed before detach, rather than starting from scratch with no saved UE history.

In some other embodiment of inventive concepts, when a UE is detached from the network, the UE sends its UE history as part of the detach procedure. When the UE is reattached, the network fetches the UE history information and starts using the saved UE history information instead of starting from scratch with no saved history information for the UE.

In still other embodiments of inventive concepts, the UE sends its UE history to the eNB just before detaching from the eNB, and the eNB forwards this information to the CN. The CN can replace any existing UE history for the UE, if any, with the recently received UE history or it can accumulate the UE history information each time it receives it.

The inactive statistics of a UE can be used in several ways by the network, ranging from inferring to advanced machine learning. With inferring, for example, if it is observed that the UE stays too long in inactive mode, and also stays a reasonably long time in active mode once it is transitioned into that, then the network may prefer to put the UE directly in IDLE mode when an inactivity timer expires rather than put the UE in inactive mode and consume resources for a long time. In another example, if it is observed that the UE usually spends a short time in inactive mode, then the network may prefer to put the UE in inactive mode when an inactivity timer expires rather than put the UE in IDLE mode, which could have led to a delay in connection setup as well as cause unnecessary signaling load in the core network. In another example, if it is observed that the UE performs very frequent transitions between inactive to active mode, then the network could increase the inactivity timer for the UE in order to reduce the number of transitions in the future, and thus reduce the possible data transmission delays incurred in inactive to active transitions.

With advanced machine learning, the network may analyze not only a single UE's behavior but also that of a group of UEs. For example, if is observed that most UEs tend to stay too long in inactive mode during certain times of the day, the network can refrain from putting UEs to inactive mode when their inactivity timer expires during these times and put them in IDLE mode directly.

The enhanced UE history information can also be used to facilitate the recovery of the UE context in inactive to active transitions. For example, if it is observed from a UE's mobility history that the UE usually passes through cells A→B→C→D→E during a certain time of the day, the UE context can be passed on to the cell that the UE will be likely to go active/connected on even before the UE has sent a resume request (e.g., the cell to which to pass the UE context to can be inferred, for example, from the average time the UE stays in inactive mode, and the average time the UE stays in each cell).

According to additional embodiments of inventive concepts, the UE history can be used to analyze accumulated UE history of several UEs (if the network keeps such information). The core network CN can employ advanced machine learning techniques to analyze the inactive/connected/idle staying times of several UEs with the type of services the UEs have been using during the state transitions to infer a best decision on the future placement of the UE in IDLE or INACTIVE mode (e.g., if the network finds a pattern that users using a certain service, e.g. social network, during certain time of the day, are more likely to come back from inactive state to active state more frequently than UEs that use other services, e.g. video conferencing, then it may decide to put UEs actively using social networking app to inactive mode when their inactivity timer expires while putting UEs that were using only video conferencing service to IDLE mode when their inactivity timer expires).

Operations of wireless terminal 800 will now be discussed with reference to the flow chart of FIG. 10 and the memory modules of FIG. 11. For example, modules may be stored in wireless terminal memory 807 of FIG. 8 as shown in FIG. 11, and these modules may provide instructions so that when the instructions of a module are executed by processor 803, processor 803 performs respective operations of the flow chart of FIG. 10.

As discussed above, wireless terminal UE 800 may thus support wireless communication with a wireless communication network. More particularly, wireless terminal 800 may be configured to operate in a connected mode during which wireless terminal 800 transmits uplink data to the wireless communication network and/or receives downlink data from the wireless communication network, in an inactive mode during which the wireless terminal maintains an access stratum context and a resume identity, and in an idle mode during which the wireless terminal does not maintain an access stratum context.

At block 1001, wireless terminal processor 803 may store mobility history information including information for at least first and second cells most recently visited by the wireless terminal (for example, using storage module 1101). The information for the first cell may include a total time spent in the first cell and a time spent in the inactive mode in the first cell, and the information for the second cell may include a total time spent in the second cell and a time spent in the inactive mode in the second cell. Two cells are discussed by way of example, but the mobility history information may be maintained for any number of most recently visited cells. For example, the mobility history information may include information for 8 cells most recently visited by the wireless terminal, and/or the mobility history information may include information for 16 cells most recently visited by the wireless terminal. The access stratum context may include at least one of a Radio Resource Control (RRC) configuration, a security context, a packet data convergence protocol (PDCP) state, a robust header compression (RoHC) state, a cell radio network temporary identifier (C-RNTI), and/or an identity of the source PCell.

The mobility history information may include additional information for each of the most recently visited cells. According to some embodiments, the information for the first cell may further includes a longest time spent in the inactive mode in the first cell, and the information for the second cell may further include a longest time spent in the inactive mode in the second cell. According to some embodiments, the information for the first cell may further include a shortest time spent in the inactive mode in the first cell, and the information for the second cell may further include a shortest time spent in the inactive mode in the second cell. According to some embodiments, the information for the first cell may further include an average time spent in the inactive mode in the first cell, and the information for the second cell may further include an average time spent in the inactive mode in the second cell. According to some embodiments, the information for the first cell may further include a number of successful transitions from the inactive mode to a connected mode that have occurred for the wireless terminal in the first cell, and the information for the second cell may further includes a number of successful transitions from the inactive mode to the connected mode that have occurred for the wireless terminal in the second cell. According to some embodiments, the information for the first cell may further include a number of failed transitions from the inactive mode to a connected mode that have occurred for the wireless terminal in the first cell, and the information for the second cell may further include a number of failed transitions from the inactive mode to the connected mode that have occurred for the wireless terminal in the second cell.

According to some embodiments, the information for the first cell may further include at least one of: a number of transitions from the connected mode to the inactive mode for the wireless terminal in the first cell with respective timestamps; a number of transitions from the inactive mode to the connected mode for the wireless terminal in the first cell with respective timestamps; a number of transitions from the inactive mode to the idle mode for the wireless terminal in the first cell with respective timestamps; a number of transitions from the idle mode to the inactive mode for the wireless terminal in the first cell with respective timestamps; a number of transitions from the idle mode to the connected mode for the wireless terminal in the first cell with respective timestamps; and/or a number of transitions from the connected mode to the idle mode for the wireless terminal in the first cell with respective timestamps; and wherein the information for the second cell further includes at least one of a number of transitions from the connected mode to the inactive mode for the wireless terminal in the second cell with respective timestamps; a number of transitions from the inactive mode to the connected mode for the wireless terminal in the second cell with respective timestamps; a number of transitions from the inactive mode to the idle mode for the wireless terminal in the second cell with respective timestamps; a number of transitions from the idle mode to the inactive mode for the wireless terminal in the second cell with respective timestamps; a number of transitions from the idle mode to the connected mode for the wireless terminal in the second cell with respective timestamps; and/or a number of transitions from the connected mode to the idle mode for the wireless terminal in the second cell with respective timestamps.

At block 1003, wireless terminal processor 803 may perform a connection setup/resume (for example, using connection module 1103). With a connection setup, processor 803 may transmit an RRCConnectionSetupComplete message through transceiver 801 to the base station, and the RRCConnectionSetupComplete message may include an information flag indicating availability of the mobility history information. With a connection resume, processor 803 may transmit an RRCConnectionResumeComplete message through transceiver 801 to the base station, and the RRCConnectionResumeComplete message may include an information flag indicating availability of the mobility history information.

At block 1005, processor 803 may receive (through transceiver 801) an information request from base station eNB of the wireless communication network (e.g., using information reception module 1105). The information request may be received, for example, in a UEInformationRequest message. With a connection setup, the information request may be received from the base station after transmitting the RRCConnectionSetupComplete message including the information flag. With a connection resume, the information request may be received from the base station after transmitting the RRCConnectionResumeComplete message including the information flag.

At block 1007, processor 803 may transmit the mobility history information for the at least the first and second cells most recently visited by the wireless terminal through transceiver 801 to the base station of the wireless communication network (e.g., using MHI transmission module 1107). Transmitting the mobility history information may include transmitting the mobility history information responsive to receiving the information request. The mobility history information, for example, may be transmitted in a UEInformationResponse message.

At block 1001, the mobility history information may be stored in volatile memory of memory 805. During a detach operation, the mobility history information may be saved to non-volatile memory of memory 805. At block 1009, processor 803 may initiate a detach from the wireless communication network, for example, responsive to at least one of powering off the wireless terminal, battery capacity of the wireless terminal falling below a threshold, radio link failure, and/or receipt of a detach instruction from the wireless communication network (e.g., using detach initiation module 1109). Responsive to initiating the detach, processor 803 may store the mobility history information in non-volatile memory at the wireless terminal and/or transmit the mobility history information to the wireless communication network at block 1011 (e.g., using store/transmit module 1111). At block 1013, processor 803 may detach from the wireless communication network responsive to initiating the detach from the wireless communication network (e.g., using detach module 1113).

At block 1015, processor 803 may reattach to the wireless communication network after detaching (e.g., using reattach module 1115). Responsive to reattaching to the wireless communication network after detaching, processor 803 may obtain the mobility history information at block 1017 (e.g., using obtaining module 1117). If the mobility history information was stored to non-volatile memory at block 1011, processor 803 may obtain the mobility history information from the non-volatile memory of the wireless terminal. If the mobility history information was transmitted to the wireless communication network at block 1011, processor 803 may obtain the mobility history information from the wireless communication network.

Figure 10:
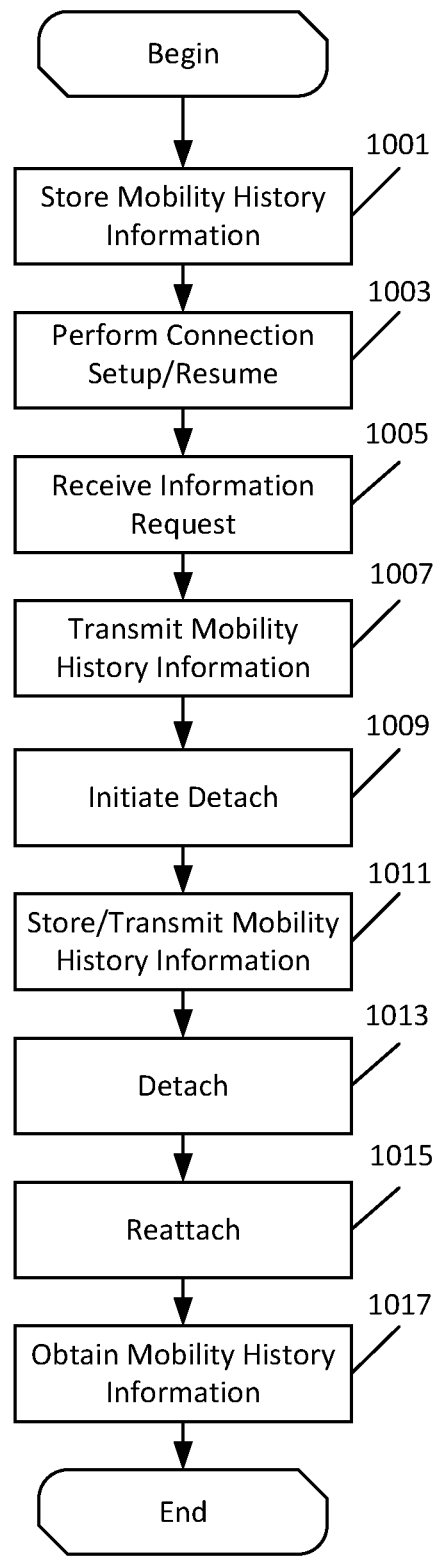
FIG. 10 is a flow chart illustrating wireless terminal operations according to some embodiments of inventive concepts.
Figure 11:
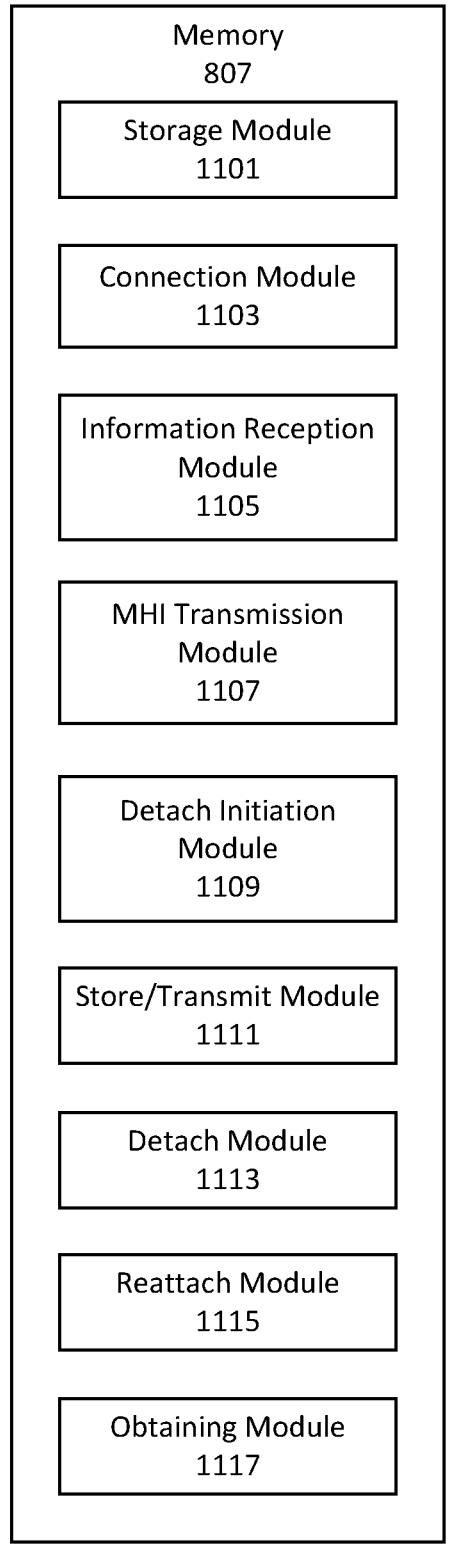
FIG. 11 is a block diagram illustrating memory modules corresponding to operations of FIG. 10 according to some embodiments of inventive concepts.

Various operations of FIG. 10 and/or modules of FIG. 11 may be optional with respect to some embodiments. Regarding methods of example embodiment 1 (set forth below), for example, operations of blocks 1003, 1005, 1009, 1011, 1013, 1015, and 1017 of FIG. 10 and modules 1103, 1105, 1109, 1111, 1113, 1115, and 1117 of FIG. 11 may be optional.

Operations of network node 900 will now be discussed with reference to the flow chart of FIG. 12 and the memory modules of FIG. 13. For example, modules may be stored in network node memory 909 of FIG. 9 as shown in FIG. 13, and these modules may provide instructions so that when the instructions of a module are executed by processor 903, processor 903 performs respective operations of the flow chart of FIG. 12.

Network node 900 may support communication with wireless terminal 800. More particularly, network node 900 may be configured to support a connected mode for the wireless terminal during which uplink data is received from the wireless terminal and/or downlink data is transmitted to the wireless terminal, an inactive mode for the wireless terminal during which an access stratum context and a resume identity are maintained for the wireless terminal, and to support an idle mode for the wireless terminal during which an access stratum context is not maintained for the wireless terminal. The access stratum context for the wireless terminal may include at least one of a Radio Resource Control (RRC) configuration, a security context, a packet data convergence protocol (PDCP) state, a robust header compression (RoHC) state, a cell radio network temporary identifier (C-RNTI), and/or an identity of the source PCell.

At block 1201, processor 903 may receive (through transceiver 907) a setup/resume complete message (e.g., using reception module 1301). For a connection setup, processor 903 may receive an RRCConnectionSetupComplete message from the wireless terminal, and the RRCConnectionSetupComplete message may include an information flag indicating availability of the mobility history information. For a connection resume, processor 903 may receive an RRCConnectionResumeComplete message from the wireless terminal, and the RRCConnectionResumeComplete message may include an information flag indicating availability of the mobility history information.

At block 1203, processor 903 may initiate transmission of an information request to the wireless terminal (e.g., using information transmission module 1303). For example, the information request may be transmitted in a UEInformationRequest message. For a connection setup, processor 903 may initiate transmission of the information request to the wireless terminal responsive to receiving the RRCConnectionSetupComplete message including the information flag. For a connection resume, processor 903 may initiate transmission of the information request to the wireless terminal responsive to receiving the RRCConnectionResumeComplete message including the information flag.

At block 1205, processor 903 may receive mobility history information from the wireless terminal after transmitting the information request (e.g., using Mobility History Information Reception Module 1205). The mobility history information may include information for at least first and second cells most recently visited by the wireless terminal. The information for the first cell may include a total time spent by the wireless terminal in the first cell and a time spent by the wireless terminal in the inactive mode in the first cell. The information for the second cell may include a total time spent by the wireless terminal in the second cell and a time spent by the wireless terminal in the inactive mode in the second cell. Moreover, the mobility history information may be received in a UEInformationResponse message. The mobility history information may include information for the 8 cells most recently visited by the wireless terminal, and/or the mobility history information may include information for the 16 cells most recently visited by the wireless terminal.

The mobility history information may include additional information for each of the most recently visited cells. According to some embodiments, the information for the first cell may further includes a longest time spent in the inactive mode in the first cell, and the information for the second cell may further include a longest time spent in the inactive mode in the second cell. According to some embodiments, the information for the first cell may further include a shortest time spent in the inactive mode in the first cell, and the information for the second cell may further include a shortest time spent in the inactive mode in the second cell. According to some embodiments, the information for the first cell may further include an average time spent in the inactive mode in the first cell, and the information for the second cell may further include an average time spent in the inactive mode in the second cell. According to some embodiments, the information for the first cell may further include a number of successful transitions from the inactive mode to a connected mode that have occurred for the wireless terminal in the first cell, and the information for the second cell may further includes a number of successful transitions from the inactive mode to the connected mode that have occurred for the wireless terminal in the second cell. According to some embodiments, the information for the first cell may further include a number of failed transitions from the inactive mode to a connected mode that have occurred for the wireless terminal in the first cell, and the information for the second cell may further include a number of failed transitions from the inactive mode to the connected mode that have occurred for the wireless terminal in the second cell.

According to some embodiments, the information for the first cell may further include at least one of: a number of transitions from the connected mode to the inactive mode for the wireless terminal in the first cell with respective timestamps; a number of transitions from the inactive mode to the connected mode for the wireless terminal in the first cell with respective timestamps; a number of transitions from the inactive mode to the idle mode for the wireless terminal in the first cell with respective timestamps; a number of transitions from the idle mode to the inactive mode for the wireless terminal in the first cell with respective timestamps; a number of transitions from the idle mode to the connected mode for the wireless terminal in the first cell with respective timestamps; and/or a number of transitions from the connected mode to the idle mode for the wireless terminal in the first cell with respective timestamps; and wherein the information for the second cell further includes at least one of a number of transitions from the connected mode to the inactive mode for the wireless terminal in the second cell with respective timestamps; a number of transitions from the inactive mode to the connected mode for the wireless terminal in the second cell with respective timestamps; a number of transitions from the inactive mode to the idle mode for the wireless terminal in the second cell with respective timestamps; a number of transitions from the idle mode to the inactive mode for the wireless terminal in the second cell with respective timestamps; a number of transitions from the idle mode to the connected mode for the wireless terminal in the second cell with respective timestamps; and/or a number of transitions from the connected mode to the idle mode for the wireless terminal in the second cell with respective timestamps.

Responsive to determining timeout of an inactivity timer for the wireless terminal at block 1207 (e.g., using timeout determination module 1307), processor 903 may select one of the inactive mode or the idle mode for the wireless terminal based on the mobility history information for the wireless terminal at block 1209 (e.g., using inactive/idle selection module 1309).

Processor 903 may select the inactive mode for the wireless terminal at block 1209 responsive to predicting a relatively short time in the inactive mode based on the mobility history information for the wireless terminal. Responsive to selecting the inactive mode for the wireless terminal at block 1309, processor 903 may initiate transmission (1211) of a Radio Resource Control Connection Release message to the wireless terminal at block 1211 while maintaining an access stratum context for the wireless terminal (e.g., using inactive transmission module 1311). Moreover, the Radio Resource Control Connection Release message may include a resume identity for the wireless terminal.

After initiating transmission of the Radio Resource Control Connection Release message, processor 903 may select a cell of a second node at block 1213 based on the mobility history information for the wireless terminal while the wireless terminal is in the inactive mode (e.g., using cell selection module 1313). Selecting the cell of the second node may include selecting the cell of the second node responsive to predicting movement of the wireless terminal to the cell of the second node while in the inactive mode based on the mobility history information for the wireless terminal. At block 1215, processor 903 may transmit the access stratum context for the wireless terminal to a second network node including the selected cell while the wireless terminal is in the inactive mode (e.g., using AS context transmission module).

Processor 903 may select the idle mode for the wireless terminal at block 1209 responsive to predicting a relatively long time in the inactive mode based on the mobility history information for the wireless terminal. Responsive to selecting the idle mode for the wireless terminal at block 1209, processor 903 may initiate transmission of a Radio Resource Control Connection Release message to the wireless terminal at block 1217 without maintaining an access stratum context for the wireless terminal (e.g., using idle transmission module 1217). The Radio Resource Control Connection Release message may not include a resume identity for the wireless terminal.

According to some embodiments, processor 903 may select one of the inactive mode or the idle mode for the wireless terminal at block 1209 responsive to timeout of the activity timer for the wireless terminal based on an aggregation of mobility history information for a plurality of mobile terminals.

Figure 12:
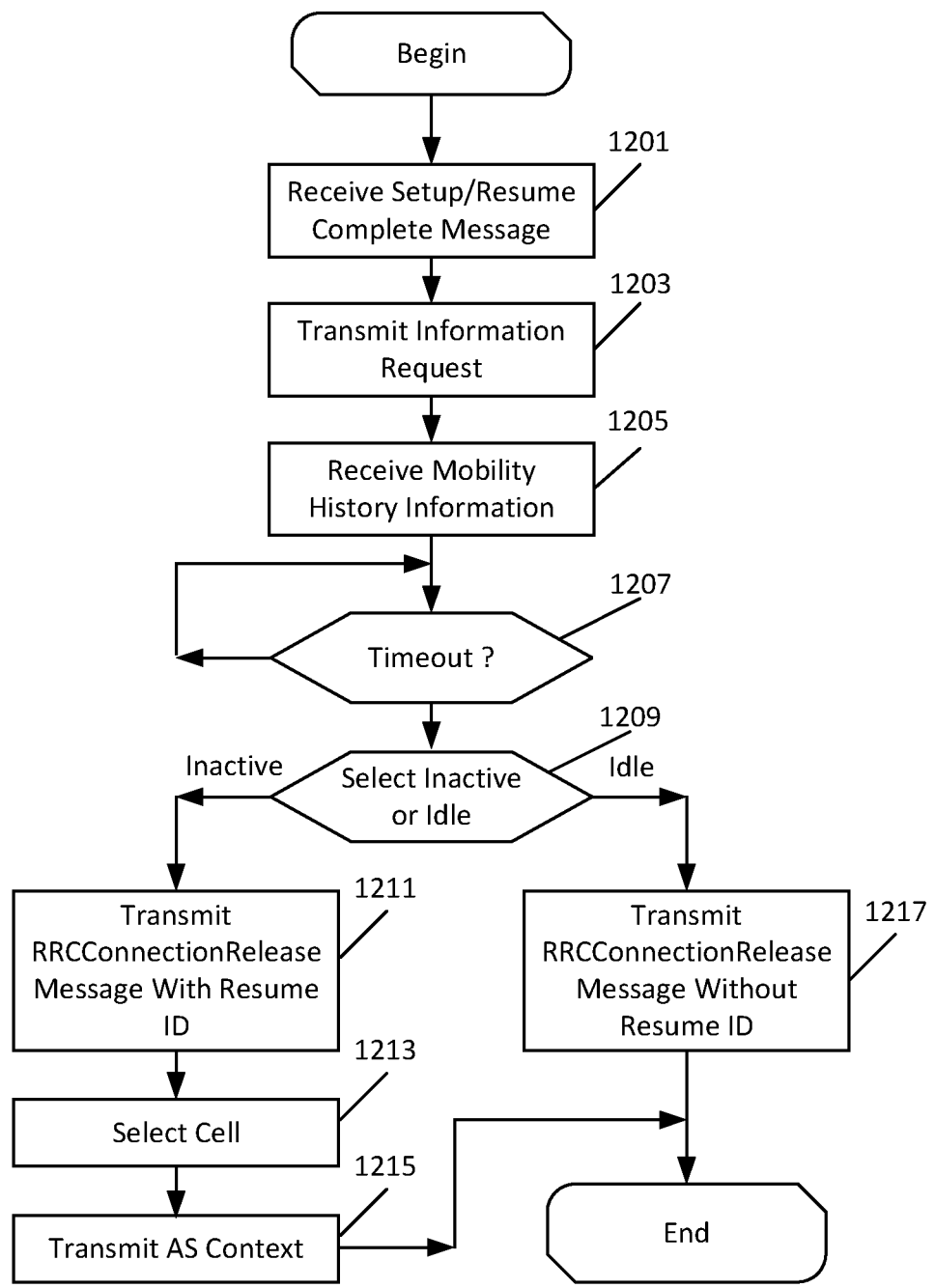
FIG. 12 is a flow chart illustrating network node operations according to some embodiments of inventive concepts.
Figure 13:
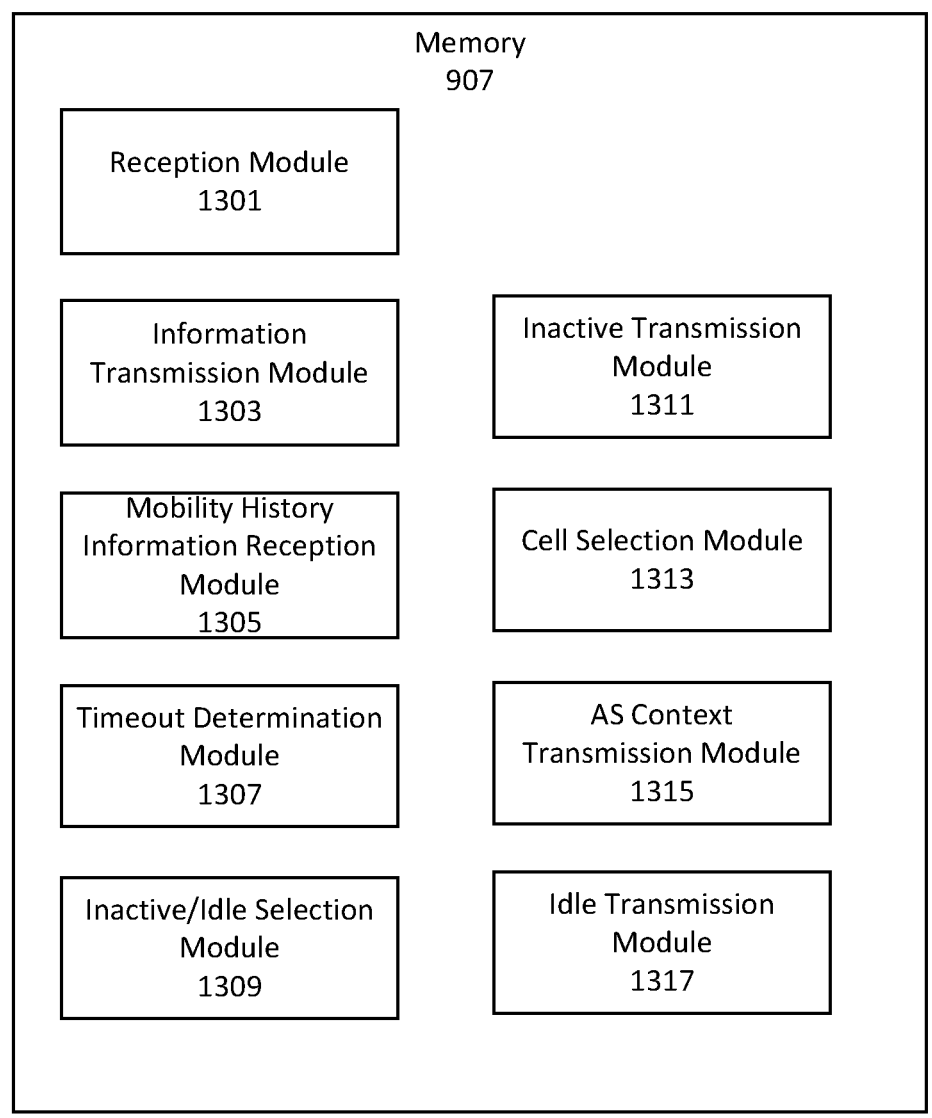
FIG. 13 is a block diagram illustrating memory modules corresponding to operations of FIG. 12 according to some embodiments of inventive concepts.

Various operations of FIG. 12 and/or modules of FIG. 13 may be optional with respect to some embodiments. Regarding methods of example embodiment 20 (set forth below), for example, operations of blocks 1201, 1203, 1207, 1209, 1211, 1213, 1215, and 1217 of FIG. 12 and modules 1301, 1303, 1307, 1309, 1311, 1313, 1315, and 1317 of FIG. 13 may be optional.

Additional/alternative operations of network node 900 will now be discussed with reference to the flow charts of FIGS. 14, 15, and 16. As discussed above, modules may be stored in network node memory 909 of FIG. 9, and these modules may provide instructions so that when the instructions of a module are executed by processor 903, processor 903 performs respective operations of the flow chart of FIG. 14, 15, or 16.

In each of FIGS. 14, 15, and 16, network node 900 may support communication with wireless terminal 800. More particularly, network node 900 may be configured to support a connected mode for the wireless terminal during which uplink data is received from the wireless terminal and/or downlink data is transmitted to the wireless terminal, an inactive mode for the wireless terminal during which an access stratum context and a resume identity are maintained for the wireless terminal, and to support an idle mode for the wireless terminal during which an access stratum context is not maintained for the wireless terminal. The access stratum context for the wireless terminal may include at least one of a Radio Resource Control (RRC) configuration, a security context, a packet data convergence protocol (PDCP) state, a robust header compression (RoHC) state, a cell radio network temporary identifier (C-RNTI), and/or an identity of the source PCell.

Regarding FIG. 14, the network node may be a base station, and processor 903 may transmit an instruction to the wireless terminal to detach from the wireless communication network at block 1401 (e.g., using an instruction transmission module). At block 1403, processor 903 may receive mobility history information from the wireless terminal (e.g., using a mobility history information reception module). As discussed above, the mobility history information may include information for at least first and second cells most recently visited by the wireless terminal. The information for the first cell may include a total time spent by the wireless terminal in the first cell and a time spent by the wireless terminal in the inactive mode in the first cell, and the information for the second cell may include a total time spent by the wireless terminal in the second cell and a time spent by the wireless terminal in the inactive mode in the second cell. After receiving the mobility history information at block 1403, processor 903 may complete a detach of the wireless terminal from the wireless communication network at block 1405 (e.g., using a detach completion module). At block 1407, processor 903 may forward the mobility history information from the base station to a core network node of the wireless communication network (e.g., using a network forwarding module).

Regarding FIG. 15, the network node may be a base station, and processor 903 may transmit an instruction to the wireless terminal to detach form the wireless communication network at block 1501 (e.g., using an instruction transmission module). At block 1503, processor 903 may receive mobility history information from the wireless terminal (e.g., using a mobility history information reception module). As discussed above, the mobility history information may include information for at least first and second cells most recently visited by the wireless terminal. The information for the first cell may include a total time spent by the wireless terminal in the first cell and a time spent by the wireless terminal in the inactive mode in the first cell, and the information for the second cell may include a total time spent by the wireless terminal in the second cell and a time spent by the wireless terminal in the inactive mode in the second cell. After receiving the mobility history information, processor 903 may complete a detach of the wireless terminal from the wireless communication network at block 1505 (e.g., using a detach module). Responsive to the wireless terminal reattaching to the wireless communication network at block 1507 (e.g., using a reattach module), processor 903 may transmit the mobility history information to the wireless terminal at block 1509 (e.g., using a MHI transmission module).

Regarding FIG. 16, the network node may be a core network node. At block 1601, processor 903 may receive mobility history information from the wireless terminal (e.g., using a MHI reception module) through a base station and through network interface 905. The mobility history information may include information for at least first and second cells most recently visited by the wireless terminal. The information for the first cell may include a total time spent by the wireless terminal in the first cell and a time spent by the wireless terminal in the inactive mode in the first cell. The information for the second cell may include a total time spent by the wireless terminal in the second cell and a time spent by the wireless terminal in the inactive mode in the second cell. At block 1603, processor 903 may analyzing the mobility history information for a plurality of wireless terminals including the mobility history information from the wireless terminal (e.g., using an analysis module). Processor 903 may provide guidance to the base station to select one of the inactive mode or the idle mode for the wireless terminal at block 1605 based on a service used by the wireless terminal and/or based on analysis of the mobility history information for the plurality of wireless terminals (e.g. using a guidance module).

According to some other embodiments of FIG. 16, the network node may be a core network node. At block 1601, processor 903 may receive current mobility history information for a wireless terminal from a radio access network base station and provide an accumulation of mobility history information for the wireless terminal including the current mobility history information received from the base station and previously received mobility history information for the wireless terminal. At block 1603, processor 903 may analyze the accumulation of mobility history information for the wireless terminal. At block 1605, processor 903 may provide guidance to the base station to select one of the inactive mode or the idle mode for the wireless terminal based on analysis of the accumulation of mobility history information for the wireless terminal.

According to still other embodiments of FIG. 16, the network node may be a core network node. At block 1601, processor 903 may receive the mobility history information from a radio access network base station as current mobility history information and replace previous mobility history information for the wireless terminal with the current mobility history information. At block 1603, processor 903 may analyze the current mobility history information for the wireless terminal. At block 1605, processor 903 may provide guidance to the base station to select one of the inactive mode or the idle mode for the wireless terminal based on analysis of the current mobility history information for the wireless terminal.

By way of example, the guidance may include a recommendation/instruction to the base station at block 1605 that: the wireless terminal should be placed in the inactive mode responsive to timeout of an inactivity timer; the wireless terminal should be placed in the idle mode responsive to timeout of an inactivity timer; or the wireless terminal should be placed in the inactive mode responsive to timeout of an inactivity timer when using a first service (or first group of services) or in the idle mode responsive to timeout of the inactivity timer when using a second service (or a second group of services) different than the first service (or first group of services).

Example embodiments are discussed below.

1. A method of operating a wireless terminal (UE) supporting wireless communication with a wireless communication network, wherein the wireless terminal is configured to operate in a connected mode during which the wireless terminal transmits uplink data to the wireless communication network and/or receives downlink data from the wireless communication network, in an inactive mode during which the wireless terminal maintains an access stratum context and a resume identity, and in an idle mode during which the wireless terminal does not maintain an access stratum context, the method comprising: storing (1001) mobility history information including information for at least first and second cells most recently visited by the wireless terminal, wherein the information for the first cell includes a total time spent in the first cell and a time spent in the inactive mode in the first cell, and wherein information for the second cell includes a total time spent in the second cell and a time spent in the inactive mode in the second cell; and transmitting (1007) the mobility history information for the at least the first and second cells most recently visited by the wireless terminal to a base station of the wireless communication network.

2. The method of Embodiment 1, wherein the information for the first cell further includes a longest time spent in the inactive mode in the first cell, and wherein the information for the second cell further includes a longest time spent in the inactive mode in the second cell.

3. The method of any of Embodiments 1-2, wherein the information for the first cell further includes a shortest time spent in the inactive mode in the first cell, and wherein the information for the second cell further includes a shortest time spent in the inactive mode in the second cell.

4. The method of any of Embodiments 1-3, wherein the information for the first cell further includes an average time spent in the inactive mode in the first cell, and wherein the information for the second cell further includes an average time spent in the inactive mode in the second cell.

5. The method of any of Embodiments 1-4, wherein the information for the first cell further includes a number of successful transitions from the inactive mode to a connected mode that have occurred for the wireless terminal in the first cell, and wherein the information for the second cell further includes a number of successful transitions from the inactive mode to the connected mode that have occurred for the wireless terminal in the second cell.

6. The method of any of Embodiments 1-5, wherein the information for the first cell further includes a number of failed transitions from the inactive mode to a connected mode that have occurred for the wireless terminal in the first cell, and wherein the information for the second cell further includes a number of failed transitions from the inactive mode to the connected mode that have occurred for the wireless terminal in the second cell.

7. The method of any of Embodiments 1-6, wherein the information for the first cell further includes at least one of a number of transitions from the connected mode to the inactive mode for the wireless terminal in the first cell with respective timestamps, a number of transitions from the inactive mode to the connected mode for the wireless terminal in the first cell with respective timestamps, a number of transitions from the inactive mode to the idle mode for the wireless terminal in the first cell with respective timestamps, a number of transitions from the idle mode to the inactive mode for the wireless terminal in the first cell with respective timestamps, a number of transitions from the idle mode to the connected mode for the wireless terminal in the first cell with respective timestamps, and/or a number of transitions from the connected mode to the idle mode for the wireless terminal in the first cell with respective timestamps, and wherein the information for the second cell further includes at least one of a number of transitions from the connected mode to the inactive mode for the wireless terminal in the second cell with respective timestamps, a number of transitions from the inactive mode to the connected mode for the wireless terminal in the second cell with respective timestamps, a number of transitions from the inactive mode to the idle mode for the wireless terminal in the second cell with respective timestamps, a number of transitions from the idle mode to the inactive mode for the wireless terminal in the second cell with respective timestamps, a number of transitions from the idle mode to the connected mode for the wireless terminal in the second cell with respective timestamps, and/or a number of transitions from the connected mode to the idle mode for the wireless terminal in the second cell with respective timestamps.

8. The method of any of Embodiments 1-7, wherein the mobility history information includes information for at least 8 cells most recently visited by the wireless terminal including the first and second cells.

9. The method of any of Embodiments 1-8 and 49-56, further comprising: receiving (1005) an information request from the base station of the wireless communication network; wherein transmitting the mobility history information comprises transmitting the mobility history information responsive to receiving the information request.

10. The method of Embodiment 9, wherein the information request is received in a UEInformationRequest message, and wherein the mobility history information is transmitted in a UEInformationResponse message.

11. The method of any of Embodiments 9-10, further comprising: transmitting (1003) an RRCConnectionSetupComplete message to the base station, wherein the RRCConnectionSetupComplete message includes an information flag indicating availability of the mobility history information; wherein receiving the information request comprises receiving the information request from the base station after transmitting the RRCConnectionSetupComplete message including the information flag.

12. The method of any of Embodiments 9-10, further comprising: transmitting (1003) an RRCConnectionResumeComplete message to the base station, wherein the RRCConnectionResumeComplete message includes an information flag indicating availability of the mobility history information; wherein receiving the information request comprises receiving the information request from the base station after transmitting the RRCConnectionResumeComplete message including the information flag.

13. The method of any of Embodiments 1-12 and 49-56, wherein the access stratum context includes at least one of a Radio Resource Control (RRC) configuration, a security context, a packet data convergence protocol (PDCP) state, a robust header compression (RoHC) state, a cell radio network temporary identifier (C-RNTI), and/or an identity of the source PCell.

14. The method of any of Embodiments 1-13 and 49-56, wherein storing the mobility history information comprises initially storing the mobility history information in volatile memory of the wireless terminal, the method further comprising: initiating (1009) a detach from the wireless communication network; responsive to initiating the detach from the wireless communication network, storing (1011) the mobility history information in non-volatile memory at the wireless terminal; responsive to initiating the detach from the wireless communication network, detaching (1013) from the wireless communication network; and responsive to reattaching to the wireless communication network after detaching, obtain (1017) the mobility history information from the non-volatile memory of the wireless terminal.

15. The method of any of Embodiments 1-13 and 49-56, the method further comprising: initiating (1009) a detach from the wireless communication network; responsive to initiating the detach from the wireless communication network, transmitting (1011) the mobility history information to the wireless communication network; responsive to initiating the detach from the wireless communication network, detaching (1013) from the wireless communication network; and responsive to reattaching to the wireless communication network after detaching, obtain (1017) the mobility history information from the wireless communication network.

16. The method of any of Embodiments 14-15, wherein initiating the detach comprises initiating the detach responsive to at least one of powering off the wireless terminal, battery capacity of the wireless terminal falling below a threshold, radio link failure, and/or receipt of a detach instruction from the wireless communication network.

17. A wireless terminal (UE) supporting wireless communication with a wireless communication network, wherein the wireless terminal is adapted to perform according to any of Embodiments 1-16 and 49-56.

18. A wireless terminal (UE) supporting wireless communication with a wireless communication network, wherein the wireless terminal comprises modules configured to perform operations according to any of Embodiments 1-16 and 49-56.

19. A wireless terminal (UE) supporting wireless communication with a wireless communication network, the wireless terminal comprising: a transceiver (801) configured to provide a wireless communication interface with the wireless communication network; and a processor (803) coupled with the transceiver, wherein the processor is configured to receive communications from the wireless communication network through the transceiver and to transmit communications to the wireless communication network through the transceiver, and wherein the processor is further configured to perform operations according to any of Embodiments 1-16 and 49-56.

20. A method of operating a node of a wireless communication network supporting communication with a wireless terminal, wherein the node is configured to support a connected mode for the wireless terminal during which uplink data is received from the wireless terminal and/or downlink data is transmitted to the wireless terminal, wherein the node is configured to support an inactive mode for the wireless terminal during which an access stratum context and a resume identity are maintained for the wireless terminal, and wherein the node is configured to support an idle mode for the wireless terminal during which an access stratum context is not maintained for the wireless terminal, the method comprising: providing (1205, 1403, 1503, 1601) mobility history information for the wireless terminal, wherein the mobility history information includes information for at least first and second cells most recently visited by the wireless terminal, wherein the information for the first cell includes a total time spent by the wireless terminal in the first cell and a time spent by the wireless terminal in the inactive mode in the first cell, and wherein information for the second cell includes a total time spent by the wireless terminal in the second cell and a time spent by the wireless terminal in the inactive mode in the second cell.

21. The method of Embodiment 20, wherein the information for the first cell further includes a longest time spent by the wireless terminal in the inactive mode in the first cell, and wherein the information for the second cell further includes a longest time spent by the wireless terminal in the inactive mode in the second cell.

22. The method of any of Embodiments 20-21, wherein the information for the first cell further includes a shortest time spent by the wireless terminal in the inactive mode in the first cell, and wherein the information for the second cell further includes a shortest time spent by the wireless terminal in the inactive mode in the second cell.

23. The method of any of Embodiments 20-22, wherein the information for the first cell further includes an average time spent by the wireless terminal in the inactive mode in the first cell, and wherein the information for the second cell further includes an average time spent by the wireless terminal in the inactive mode in the second cell.

24. The method of any of Embodiments 20-23, wherein the information for the first cell further includes a number of successful transitions from the inactive mode to a connected mode that have occurred for the wireless terminal in the first cell, and wherein the information for the second cell further includes a number of successful transitions from the inactive mode to the connected mode that have occurred for the wireless terminal in the second cell.

25. The method of any of Embodiments 20-24, wherein the information for the first cell further includes a number of failed transitions from the inactive mode to a connected mode that have occurred for the wireless terminal in the first cell, and wherein the information for the second cell further includes a number of failed transitions from the inactive mode to the connected mode that have occurred for the wireless terminal in the second cell.

26. The method of any of Embodiments 20-25, wherein the information for the first cell further includes at least one of a number of transitions from the connected mode to the inactive mode for the wireless terminal in the first cell with respective timestamps, a number of transitions from the inactive mode to the connected mode for the wireless terminal in the first cell with respective timestamps, a number of transitions from the inactive mode to the idle mode for the wireless terminal in the first cell with respective timestamps, a number of transitions from the idle mode to the inactive mode for the wireless terminal in the first cell with respective timestamps, a number of transitions from the idle mode to the connected mode for the wireless terminal in the first cell with respective timestamps, and/or a number of transitions from the connected mode to the idle mode for the wireless terminal in the first cell with respective timestamps, and wherein the information for the second cell further includes at least one of a number of transitions from the connected mode to the inactive mode for the wireless terminal in the second cell with respective timestamps, a number of transitions from the inactive mode to the connected mode for the wireless terminal in the second cell with respective timestamps, a number of transitions from the inactive mode to the idle mode for the wireless terminal in the second cell with respective timestamps, a number of transitions from the idle mode to the inactive mode for the wireless terminal in the second cell with respective timestamps, a number of transitions from the idle mode to the connected mode for the wireless terminal in the second cell with respective timestamps, and/or a number of transitions from the connected mode to the idle mode for the wireless terminal in the second cell with respective timestamps.

27. The method of any of Embodiments 20-26, wherein the mobility history information includes information for at least 8 cells most recently visited by the wireless terminal including the first and second cells.

28. The method of any of Embodiments 20-27 and 57-64, further comprising: initiating transmission of (1203) an information request to the wireless terminal; wherein providing the mobility history information comprises receiving the mobility history information from the wireless terminal after transmitting the information request.

29. The method of Embodiment 28, wherein the information request is transmitted in a UEInformationRequest message, and wherein the mobility history information is received in a UEInformationResponse message.

30. The method of any of Embodiments 28-29, further comprising: receiving (1201) an RRCConnectionSetupComplete message from the wireless terminal, wherein the RRCConnectionSetupComplete message includes an information flag indicating availability of the mobility history information; wherein initiating transmission of the information request comprises initiating transmission of the information request to the wireless terminal responsive to receiving the RRCConnectionSetupComplete message including the information flag.

31. The method of any of Embodiments 28-29, further comprising: receiving (1201) an RRCConnectionResumeComplete message from the wireless terminal, wherein the RRCConnectionResumeComplete message includes an information flag indicating availability of the mobility history information; wherein initiating transmission of the information request comprises initiating transmission of the information request to the wireless terminal responsive to receiving the RRCConnectionResumeComplete message including the information flag.

32. The method of any of Embodiments 20-31 and 57-64, wherein the access stratum context for the wireless terminal includes at least one of a Radio Resource Control (RRC) configuration, a security context, a packet data convergence protocol (PDCP) state, a robust header compression (RoHC) state, a cell radio network temporary identifier (C-RNTI), and/or an identity of the source PCell.

33. The method of any of Embodiments 20-32 and 57-64, further comprising;
responsive to timeout of an inactivity timer for the wireless terminal, selecting (1209) one of the inactive mode or the idle mode for the wireless terminal based on the mobility history information for the wireless terminal.

34. The method of Embodiments 33, wherein selecting comprises selecting the inactive mode for the wireless terminal responsive to predicting a relatively short time in the inactive mode based on the mobility history information for the wireless terminal, the method further comprising: responsive to selecting the inactive mode for the wireless terminal, initiating transmission (1211) of a Radio Resource Control Connection Release message to the wireless terminal while maintaining an access stratum context for the wireless terminal, wherein the Radio Resource Control Connection Release message includes a resume identity for the wireless terminal.

35. The method of any of Embodiments 20-34 and 57-64, further comprising: after initiating transmission of the Radio Resource Control Connection Release message, selecting (1213) a cell of a second node based on the mobility history information for the wireless terminal while the wireless terminal is in the inactive mode; and transmitting (1215) the access stratum context for the wireless terminal to a second network node including the selected cell while the wireless terminal is in the inactive mode.

36. The method of Embodiment 35, wherein selecting the cell of the second node comprises selecting the cell of the second node responsive to predicting movement of the wireless terminal to the cell of the second node while in the inactive mode based on the mobility history information for the wireless terminal.

37. The method of Embodiments 33, wherein selecting comprises selecting the idle mode for the wireless terminal responsive to predicting a relatively long time in the inactive mode based on the mobility history information for the wireless terminal, the method further comprising: responsive to selecting the idle mode for the wireless terminal, initiating transmission (1217) of a Radio Resource Control Connection Release message to the wireless terminal without maintaining an access stratum context for the wireless terminal, wherein the Radio Resource Control Connection Release message does not include a resume identity for the wireless terminal.

38. The method of any of Embodiments 20-37 and 57-64, further comprising; responsive to timeout of an inactivity timer for the wireless terminal, selecting (1209) one of the inactive mode or the idle mode for the wireless terminal based on an aggregation of mobility history information for a plurality of mobile terminals.

39. The method of any of Embodiments 20-27 and 57-64, wherein providing the mobility history information comprises receiving the mobility history information from the wireless terminal, the method further comprising: after receiving the mobility history information, completing (1405, 1505) a detach of the wireless terminal from the wireless communication network.

40. The method of Embodiment 39, wherein the node is a base station of the wireless communication network, the method further comprising: forwarding (1407) the mobility history information from the base station to a core network node of the wireless communication network.

41. The method of Embodiment 39, further comprising: responsive to the wireless terminal reattaching to the wireless communication network (1507), transmitting (1509) the mobility history information to the wireless terminal.

42. The method of any of Embodiments 39-41, the method further comprising: before receiving the mobility history information, transmitting (1401) an instruction to the wireless terminal to detach from the wireless communication network.

43. The method of any of Embodiments 20-27 and 57-64, wherein the node is a core network node of the wireless communication network, wherein providing the mobility history information comprises receiving the mobility history information from a base station, the method further comprising: analyzing (1603) mobility history information for a plurality of wireless terminals including the mobility history information from the wireless terminal; and providing (1605) guidance to the base station to select one of the inactive mode or the idle mode for the wireless terminal based on a service used by the wireless terminal and/or based on analysis of the mobility history information for the plurality of wireless terminals.

44. The method of any of Embodiments 20-27 and 57-64, wherein the node is a core network node of the wireless communication network, wherein providing the mobility history information comprises receiving the mobility history information from a base station as current mobility history information, the method further comprising: providing an accumulation of mobility history information for the wireless terminal including the current mobility history information received from the base station and previously received mobility history information for the wireless terminal; analyzing the accumulation of mobility history information for the wireless terminal; and providing guidance to the base station to select one of the inactive mode or the idle mode for the wireless terminal based on analysis of the accumulation of mobility history information for the wireless terminal.

45. The method of any of Embodiments 20-27 and 57-64, wherein the node is a core network node of the wireless communication network, wherein providing the mobility history information comprises receiving the mobility history information from a base station as current mobility history information and replacing previous mobility history information for the wireless terminal with the current mobility history information, the method further comprising: analyzing the current mobility history information for the wireless terminal; and providing guidance to the base station to select one of the inactive mode or the idle mode for the wireless terminal based on analysis of the current mobility history information for the wireless terminal.

46. A network node to provide wireless communication with a wireless terminal, wherein the network node is adapted to perform according to any of Embodiments 20-45 and 57-64.

47. A network node to provide wireless communication with a wireless terminal, wherein the network node comprises modules configured to perform operations according to any of Embodiments 20-45 and 57-64.

48. A network node in a wireless communication network supporting wireless communication with a wireless terminal, the network node comprising: a network interface (905) configured to provide a communication interface with other nodes of the wireless communication network; a transceiver (907) configured to provide a wireless communication interface with the wireless terminal; and a processor (803) coupled with the transceiver and the network interface, wherein the processor is configured to receive communications from the wireless terminal through the transceiver and to transmit communications to the wireless terminal through the transceiver, wherein the processor is configured to receive communications from other nodes of the wireless communication network through the network interface and to transmit communications to other nodes of the wireless communication network through the network interface, and wherein the processor is further configured to perform operations according to any of Embodiments 20-45 and 57-64.

49. A method of operating a wireless terminal (UE) supporting wireless communication with a wireless communication network, wherein the wireless terminal is configured to operate in a connected mode during which the wireless terminal transmits uplink data to the wireless communication network and/or receives downlink data from the wireless communication network, in an inactive mode during which the wireless terminal maintains an access stratum context and a resume identity, and in an idle mode during which the wireless terminal does not maintain an access stratum context, the method comprising: storing (1001) mobility history information for a cell visited by the wireless terminal, wherein the information for the cell includes a time spent in the inactive mode in the cell; and transmitting (1007) the mobility history information for the cell visited by the wireless terminal to a base station of the wireless communication network.

50. The method of Embodiment 49, wherein the information for the cell further includes a longest time spent in the inactive mode in the cell.

51. The method of any of Embodiments 49-50, wherein the information for the cell further includes a shortest time spent in the inactive mode in the cell.

52. The method of any of Embodiments 49-51, wherein the information for the cell further includes an average time spent in the inactive mode in the cell.

53. The method of any of Embodiments 49-52, wherein the information for the cell further includes a number of successful transitions from the inactive mode to a connected mode that have occurred for the wireless terminal in the cell.

54. The method of any of Embodiments 49-53, wherein the information for the cell further includes a number of failed transitions from the inactive mode to a connected mode that have occurred for the wireless terminal in the cell.

55. The method of any of Embodiments 49-54, wherein the information for the cell further includes at least one of a number of transitions from the connected mode to the inactive mode for the wireless terminal in the cell with respective timestamps, a number of transitions from the inactive mode to the connected mode for the wireless terminal in the cell with respective timestamps, a number of transitions from the inactive mode to the idle mode for the wireless terminal in the cell with respective timestamps, a number of transitions from the idle mode to the inactive mode for the wireless terminal in the cell with respective timestamps, a number of transitions from the idle mode to the connected mode for the wireless terminal in the cell with respective timestamps, and/or a number of transitions from the connected mode to the idle mode for the wireless terminal in the cell with respective timestamps.

56. The method of any of Embodiments 49-55, wherein the information for the cell includes a total time spent by the wireless terminal in the cell.

57. A method of operating a node of a wireless communication network supporting communication with a wireless terminal, wherein the node is configured to support a connected mode for the wireless terminal during which uplink data is received from the wireless terminal and/or downlink data is transmitted to the wireless terminal, wherein the node is configured to support an inactive mode for the wireless terminal during which an access stratum context and a resume identity are maintained for the wireless terminal, and wherein the node is configured to support an idle mode for the wireless terminal during which an access stratum context is not maintained for the wireless terminal, the method comprising: providing (1205, 1403, 1503, 1601) mobility history information for the wireless terminal, wherein the mobility history information includes information for a cell visited by the wireless terminal, wherein the information for the cell includes a time spent by the wireless terminal in the inactive mode in the cell.

58. The method of Embodiment 57, wherein the information for the cell further includes a longest time spent by the wireless terminal in the inactive mode in the cell.

59. The method of any of Embodiments 57-58, wherein the information for the cell further includes a shortest time spent by the wireless terminal in the inactive mode in the cell.

60. The method of any of Embodiments 57-59, wherein the information for the cell further includes an average time spent by the wireless terminal in the inactive mode in the cell.

61. The method of any of Embodiments 57-60, wherein the information for the cell further includes a number of successful transitions from the inactive mode to a connected mode that have occurred for the wireless terminal in the cell.

62. The method of any of Embodiments 57-61, wherein the information for the cell further includes a number of failed transitions from the inactive mode to a connected mode that have occurred for the wireless terminal in the cell.

63. The method of any of Embodiments 57-62, wherein the information for the cell further includes at least one of a number of transitions from the connected mode to the inactive mode for the wireless terminal in the cell with respective timestamps, a number of transitions from the inactive mode to the connected mode for the wireless terminal in the cell with respective timestamps, a number of transitions from the inactive mode to the idle mode for the wireless terminal in the cell with respective timestamps, a number of transitions from the idle mode to the inactive mode for the wireless terminal in the first with respective timestamps, a number of transitions from the idle mode to the connected mode for the wireless terminal in the cell with respective timestamps, and/or a number of transitions from the connected mode to the idle mode for the wireless terminal in the cell with respective timestamps.

64. The method of any of Embodiments 57-63 wherein the information for the cell includes a total time spent by the wireless terminal in the cell.

Explanations of abbreviations used herein are provided below.

Abbreviation Explanation

AS Access Stratum
CN Core Network
DRB Data Radio Bearer
eNB enhanced NB
IE Information Element
LTE Long Term Evolution
MeNB: Master eNB
NB Base station
NCC Next Hop Chaining Count
NR New Radio
RLC Radio Link Control
RRC Radio Resource Control
RRM Radio Resource Management
SeNB: Secondary eNB
SRB Signaling Radio Bearer
TNL: Transport Network Layer
UE: User Equipment Further definitions are provided below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless terminal (UE) supporting wireless communication with a wireless communication network, the method comprising:
   operating in one of a connected mode during which the wireless terminal transmits uplink data to the wireless communication network and/or receives downlink data from the wireless communication network, an inactive mode during which the wireless terminal maintains an access stratum context and a resume identity, and an idle mode during which the wireless terminal does not maintain an access stratum context;
   storing mobility history information for a cell visited by the wireless terminal, wherein the mobility history information for the cell includes a time spent in the inactive mode in the cell, wherein the wireless terminal maintains the access stratum context and the resume identity in the inactive mode; and
   transmitting the mobility history information for the cell visited by the wireless terminal to a base station of the wireless communication network; and
   responsive to transmitting the mobility history information for the cell visited by the wireless terminal to the base station, receiving a Radio Resource Control Connection Release message that includes a resume identity for the wireless terminal and an access stratum context for the wireless terminal that is maintained by the base station.

2. The method of claim 1, wherein the mobility history information for the cell further includes at least one of a longest time spent in the inactive mode in the cell, a shortest time spent in the inactive mode in the cell, and/or an average time spent in the inactive mode in the cell.

3. The method of claim 1, wherein the mobility history information for the cell further includes a number of successful transitions from the inactive mode to a connected mode that have occurred for the wireless terminal in the cell.

4. The method of claim 1, wherein the mobility history information for the cell includes a total time spent by the wireless terminal in the cell.

5. A method of operating a network node of a wireless communication network supporting communication with a wireless terminal, the method comprising:
   operating to support one of a connected mode for the wireless terminal during which uplink data is received from the wireless terminal and/or downlink data is transmitted to the wireless terminal, an inactive mode for the wireless terminal during which an access stratum context and a resume identity are maintained for the wireless terminal, and an idle mode for the wireless terminal during which an access stratum context is not maintained for the wireless terminal, and
   receiving, from the wireless terminal, mobility history information for the wireless terminal, wherein the mobility history information includes information for a cell visited by the wireless terminal, wherein the information for the cell includes a time spent by the wireless terminal in the inactive mode in the cell, and wherein the network node supports the wireless terminal to maintain the access stratum context and the resume identity in the inactive mode, responsive to timeout of an inactivity timer for the wireless terminal, selecting the inactive mode for the wireless terminal responsive to predicting a relatively short time in the inactive mode based on the mobility history information for the wireless terminal, and responsive to selecting the inactive mode for the wireless terminal, initiating transmission of a Radio Resource Control Connection Release message to the wireless terminal while maintaining an access stratum context for the wireless terminal, wherein the Radio Resource Control Connection Release message includes a resume identity for the wireless terminal.

6. The method of claim 5, wherein the mobility history information for the cell further includes at least one of a longest time spent by the wireless terminal in the inactive mode in the cell, a shortest time spent by the wireless terminal in the inactive mode in the cell, and/or an average time spent by the wireless terminal in the inactive mode in the cell.

7. The method of claim 5, wherein the mobility history information for the cell further includes a number of successful transitions from the inactive mode to a connected mode that have occurred for the wireless terminal in the cell.

8. The method of claim 5 wherein the mobility history information for the cell includes a total time spent by the wireless terminal in the cell.

9. A wireless terminal (UE) supporting wireless communication with a wireless communication network, the wireless terminal comprising:
  a transceiver configured to provide a wireless communication interface with the wireless communication network; and
  a processor coupled with the transceiver, wherein the processor is configured to receive communications from the wireless communication network through the transceiver and to transmit communications to the wireless communication network through the transceiver, and wherein the processor is further configured to:
    operate in one of a connected mode during which the wireless terminal transmits uplink data to the wireless communication network and/or receives downlink data from the wireless communication network, an inactive mode during which the wireless terminal maintains an access stratum context and a resume identity, and an idle mode during which the wireless terminal does not maintain an access stratum context,
    store mobility history information for a cell visited by the wireless terminal, wherein the information for the cell includes a time spent in the inactive mode in the cell, wherein the wireless terminal maintains the access stratum context and the resume identity in the inactive mode, and
    transmit the mobility history information for the cell visited by the wireless terminal to a base station of the wireless communication network, and
    receive a Radio Resource Control Connection Release message that includes a resume identity for the wireless terminal and an access stratum context for the wireless terminal that is maintained by the base station in response to the transmission of the mobility history information for the cell visited by the wireless terminal to the base station.

10. The wireless terminal (UE) of claim 9, wherein the mobility history information for the cell further includes at least one of a longest time spent in the inactive mode in the cell, a shortest time spent in the inactive mode in the cell, and/or an average time spent in the inactive mode in the cell.

11. The wireless terminal (UE) of claim 9, wherein the mobility history information for the cell further includes a number of successful transitions from the inactive mode to a connected mode that have occurred for the wireless terminal in the cell.

12. The wireless terminal (UE) of claim 9, wherein the mobility history information for the cell includes a total time spent by the wireless terminal in the cell.

13. The wireless terminal (UE) of claim 9, wherein the processor is further configured to:
  receive an information request from the base station of the wireless communication network;
  wherein transmitting the mobility history information comprises transmitting the mobility history information responsive to receiving the information request.

14. The wireless terminal (UE) of claim 13, wherein the processor is further configured to:
  transmit an RRCConnectionResumeComplete message to the base station, wherein the RRCConnectionResumeComplete message includes an information flag indicating availability of the mobility history information;
  wherein receiving the information request comprises receiving the information request from the base station after transmitting the RRCConnectionResumeComplete message including the information flag.

15. A network node in a wireless communication network supporting wireless communication with a wireless terminal, the network node comprising:
  a network interface configured to provide a communication interface with other nodes of the wireless communication network;
  a transceiver configured to provide a wireless communication interface with the wireless terminal; and
  a processor coupled with the transceiver and the network interface, wherein the processor is configured to receive communications from the wireless terminal through the transceiver and to transmit communications to the wireless terminal through the transceiver, wherein the processor is configured to receive communications from other nodes of the wireless communication network through the network interface and to transmit communications to other nodes of the wireless communication network through the network interface, and wherein the processor is further configured to:
    operate to support one of a connected mode for the wireless terminal during which uplink data is received from the wireless terminal and/or downlink data is transmitted to the wireless terminal, an inactive mode for the wireless terminal during which an access stratum context and a resume identity are maintained for the wireless terminal, and an idle mode for the wireless terminal during which an access stratum context is not maintained for the wireless terminal,
    receive, from the wireless terminal, mobility history information for the wireless terminal, wherein the information for the cell includes a time spent by the wireless terminal in the inactive mode in the cell, and wherein the network node supports the wireless terminal to maintain the access stratum context and the resume identity in the inactive mode,
    responsive to timeout of an inactivity timer for the wireless terminal, select the inactive mode for the wireless terminal responsive to predicting a relatively short time in the inactive mode based on the mobility history information for the wireless terminal, and responsive to selecting the inactive mode for the wireless terminal, initiate transmission of a Radio Resource Control Connection Release message to the wireless terminal while maintaining an access stratum context for the wireless terminal, wherein the Radio Resource Control Connection Release message includes a resume identity for the wireless terminal.

16. The network node of claim 15, wherein the mobility history information for the cell further includes at least one of a longest time spent by the wireless terminal in the inactive mode in the cell, a shortest time spent by the wireless terminal in the inactive mode in the cell, and/or an average time spent by the wireless terminal in the inactive mode in the cell.

17. The network node of claim 15, wherein the mobility history information for the cell further includes a number of successful transitions from the inactive mode to a connected mode that have occurred for the wireless terminal in the cell.

18. The network node of claim 15 wherein the mobility history information for the cell includes a total time spent by the wireless terminal in the cell.

19. The network node of claim 15, wherein the processor is further configured to:
initiate transmission of an information request to the wireless terminal;
wherein providing the mobility history information comprises receiving the mobility history information from the wireless terminal after transmitting the information request.

20. The network node of claim 19, wherein the processor is further configured to:
receive an RRCConnectionResumeComplete message from the wireless terminal, wherein the RRCConnectionResumeComplete message includes an information flag indicating availability of the mobility history information;
wherein initiating transmission of the information request comprises initiating transmission of the information request to the wireless terminal responsive to receiving the RRCConnectionResumeComplete message including the information flag.

21. The network node of claim 15, wherein the processor is further configured to:
after initiating transmission of the Radio Resource Control Connection Release message, select a cell of a second node based on the mobility history information for the wireless terminal while the wireless terminal is in the inactive mode, and
transmit the access stratum context for the wireless terminal to a second network node including the selected cell while the wireless terminal is in the inactive mode.

22. The network node of claim 15, wherein the processor is further configured to:
after receiving the mobility history information, complete a detach of the wireless terminal from the wireless communication network.

23. The network node of claim 22, wherein the processor is further configured to:
responsive to the wireless terminal reattaching to the wireless communication network, transmit the mobility history information to the wireless terminal.

* * * * *